US008889031B2

(12) United States Patent
Sawada et al.

(10) Patent No.: US 8,889,031 B2
(45) Date of Patent: Nov. 18, 2014

(54) WORKING FLUID COMPOSITION FOR REFRIGERATOR MACHINE AND REFRIGERATING MACHINE OIL

(75) Inventors: Ken Sawada, Tokyo (JP); Kuniko Takahashi, Tokyo (JP); Hiroko Shimpo, Tokyo (JP); Katsuya Takigawa, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 335 days.

(21) Appl. No.: 13/299,652

(22) Filed: Nov. 18, 2011

(65) Prior Publication Data

US 2012/0132848 A1 May 31, 2012

(30) Foreign Application Priority Data

Nov. 30, 2010 (JP) ................................. 2010-267369

(51) Int. Cl.
*C09K 5/04* (2006.01)
*C10M 171/00* (2006.01)

(52) U.S. Cl.
CPC .......... *C09K 5/045* (2013.01); *C10M 2209/043* (2013.01); *C10N 2220/303* (2013.01); *C10M 2207/283* (2013.01); *C10M 2207/046* (2013.01); *C10M 2207/042* (2013.01); *C10M 171/008* (2013.01); *C10M 2207/026* (2013.01); *C10M 2209/1045* (2013.01); *C10M 2209/1055* (2013.01); *C10M 2215/086* (2013.01); *C10N 2220/302* (2013.01); *C10M 2223/041* (2013.01); *C09K 2205/126* (2013.01); *C10M 2215/064* (2013.01); *C10M 2215/065* (2013.01); *C10M 2223/047* (2013.01); *C10M 2223/043* (2013.01)
USPC .............................................. 252/68; 252/69

(58) Field of Classification Search
CPC .......... C09K 5/04; C09K 5/044; C09K 5/045; C09K 2205/126; C09K 2205/11; C09K 2205/112; C09K 2205/114; C09K 2205/116; C09K 2205/124; C09K 2205/132
USPC .................................................... 252/68, 69
See application file for complete search history.

(56) References Cited

U.S. PATENT DOCUMENTS

| | | | | |
|---|---|---|---|---|
| 5,498,356 A | * | 3/1996 | Kamakura et al. | 508/495 |
| 5,869,702 A | * | 2/1999 | Nakagawa et al. | 549/364 |
| 5,922,239 A | * | 7/1999 | Nakagawa et al. | 252/68 |
| 5,956,959 A | * | 9/1999 | Sunaga et al. | 62/114 |
| 6,035,661 A | * | 3/2000 | Sunaga et al. | 62/498 |
| 6,190,574 B1 | * | 2/2001 | Nakagawa et al. | 252/68 |
| 6,427,479 B1 | * | 8/2002 | Komatsubara et al. | 62/503 |
| 6,454,960 B1 | * | 9/2002 | Sunaga et al. | 252/67 |
| 6,581,404 B2 | * | 6/2003 | Komatsubara et al. | 62/474 |
| 6,644,064 B2 | * | 11/2003 | Komatsubara et al. | 62/474 |
| 7,507,348 B2 | * | 3/2009 | Kajiki et al. | 252/68 |
| 7,534,366 B2 | | 5/2009 | Singh et al. | |
| 7,794,619 B2 | * | 9/2010 | Kajiki et al. | 252/68 |
| 8,033,120 B2 | | 10/2011 | Singh et al. | |
| 2004/0119047 A1 | | 6/2004 | Singh et al. | |
| 2006/0243945 A1 | | 11/2006 | Minor et al. | |
| 2006/0278845 A1 | * | 12/2006 | Kajiki et al. | 252/68 |
| 2008/0237534 A1 | * | 10/2008 | Kajiki et al. | 252/68 |
| 2009/0302285 A1 | | 12/2009 | Singh et al. | |
| 2010/0005830 A1 | * | 1/2010 | Kaneko et al. | 62/468 |
| 2012/0024007 A1 | * | 2/2012 | Ota et al. | 62/468 |

FOREIGN PATENT DOCUMENTS

| | | |
|---|---|---|
| CN | 1396246 | 2/2003 |
| CN | 101297016 | 10/2008 |
| JP | 2-242888 A | 9/1990 |
| JP | 3-200895 A | 9/1991 |
| JP | 3-217495 A | 9/1991 |
| JP | 6-128578 A | 5/1994 |
| JP | 2006-512426 A | 4/2006 |
| JP | 2010-265429 | 11/2010 |
| JP | 2011-236314 | 11/2011 |
| WO | 2005/103190 A1 | 11/2005 |
| WO | 2006/094303 A2 | 9/2006 |
| WO | WO 2010029704 A1 * | 3/2010 |

OTHER PUBLICATIONS

English Translation of WO 2010/029704, published Mar. 18, 2010.*
Office Action mailed Apr. 25, 2014 in Chinese counterpart Application No. 201110397444.X.
Japanese Office Action in regards to Japanese Application No. 2011-262374, dated Jun. 17, 2014.

* cited by examiner

*Primary Examiner* — Douglas McGinty

(74) *Attorney, Agent, or Firm* — Greenblum & Bernstein, P.L.C.

(57) ABSTRACT

The present invention provides a working fluid composition for a refrigerator machine comprising a base oil comprising an ether-based compound, a carbodiimide compound, and an unsaturated fluorinated hydrocarbon refrigerant. The present invention also provides a refrigerating machine oil comprising a base oil containing an ether-based compound and a carbodiimide compound, the refrigerating machine oil being used together with an unsaturated fluorinated hydrocarbon refrigerant.

5 Claims, No Drawings

WORKING FLUID COMPOSITION FOR REFRIGERATOR MACHINE AND REFRIGERATING MACHINE OIL

BACKGROUND OF THE INVENTION

1. Field of the Invention

The present invention relates to a working fluid composition for a refrigerator machine and to a refrigerating machine oil. More specifically, the present invention relates to a working fluid composition for a refrigerator machine that contains a unsaturated fluorinated hydrocarbon or the like and a refrigerating machine oil, and to a refrigerating machine oil.

2. Related Background Art

In light of the problem of ozone layer depletion that has become a focus of attention in recent years, the restrictions on CFCs (chlorofluorocarbons) and HCFCs (hydrochlorofluorocarbons) that are used as refrigerants in conventional refrigerating machines have become more stringent, and HFCs (hydrofluorocarbons) are coming into use as substitute refrigerants.

Mineral oils or hydrocarbon oils such as alkylbenzenes have been preferred for use as refrigerating machine oils when CFCs or HCFCs are used as refrigerants, but since changing the refrigerant can cause the refrigerating machine oil used with it to exhibit unpredictable behavior in terms of its compatibility with the refrigerant, its lubricity, its dissolved viscosity with the refrigerant and its thermal and chemical stability, it has been necessary to develop different refrigerating machine oils for different refrigerants. Such refrigerating machine oils for HFC refrigerants have been developed, including polyalkylene glycols (Japanese Unexamined Patent Application Publication HEI No. 02-242888), esters (Japanese Unexamined Patent Application Publication HEI No. 03-200895), carbonic acid esters (Japanese Unexamined Patent Application Publication HEI No. 03-217495) and polyvinyl ethers (Japanese Unexamined Patent Application Publication HEI No. 06-128578).

Among HFC refrigerants, HFC-134a, R407C and R410A are routinely used as refrigerants for automobile air conditioners, refrigerators and room air conditioners. However, while these HFC refrigerants have ozone depletion potentials (ODP) of zero, their high global warming potentials (GWP) have led to their gradual restriction. It has therefore become an urgent issue to develop refrigerants as substitutes for such HFCs.

In light of this background it has been proposed to use, as substitute refrigerants for HFCs, fluoropropene refrigerants which have very low ODP and GWP, are noncombustible and are comparable or superior to HFCs in terms of their thermodynamic properties, as a measure of refrigerant performance. There has also been proposed the use of refrigerant mixtures of fluoropropene with saturated hydrofluorocarbons, C3-5 saturated hydrocarbons, dimethyl ether, carbon dioxide, bis(trifluoromethyl)sulfide or trifluoroiodomethane (see International Patent Publication No. WO2006/094303).

In addition, there have been proposed refrigerating machine oils that employ mineral oils, alkylbenzenes, poly-α-olefins, polyalkyleneglycols, monoesters, diesters, polyol esters, phthalic acid esters, alkyl ethers, ketones, carbonic acid esters, polyvinyl ethers and the like, as refrigerating machine oils that can be used with unsaturated fluorinated hydrocarbon refrigerants or refrigerant mixtures of unsaturated fluorinated hydrocarbons and saturated hydrofluorocarbons, C3-5 saturated hydrocarbons, dimethyl ether, carbon dioxide, bis(trifluoromethyl)sulfide or trifluoroiodomethane (International Patent Publication No. WO2006/094303, Japanese Patent Public Inspection No. 2006-512426 and International Patent Publication No. WO2005/103190).

SUMMARY OF THE INVENTION

In refrigeration systems employing unsaturated fluorinated hydrocarbon refrigerants, as described in International Patent Publication No. WO2006/094303, Japanese Patent Public Inspection No. 2006-512426 and International Patent Publication No. WO2005/103190, the refrigerating machine oil employed may be a mineral oil or a hydrocarbon such as an alkylbenzene which is used in CFCs or HCFCs, or a polyalkylene glycol, polyol ester or polyvinyl ether which is used in HFCs. Research by the present inventors, however, has shown that it is not possible to achieve a high level of the required performance simply by applying these conventional refrigerating machine oils in the systems mentioned above. Ether-based refrigerating machine oils with polyalkylene glycols or polyvinyl ethers particularly tend to cause problems in systems when the refrigerants or refrigerating machine oils decompose in the presence of unsaturated fluorinated hydrocarbons. For example, in refrigerant circulation cycles in which a flexible hose is used in the tubing for an automobile air conditioner, polyamide resins such as nylon are used on the inner walls, and polyamide resins tend to undergo deterioration in the presence of unsaturated fluorinated hydrocarbons and polyalkylene glycols.

Methods of adding acid scavengers such as epoxy compounds have been proposed for improved stability of refrigerating machine oils. Based on investigation by the present inventors, however, addition of an acid scavenger does not provide sufficient stability in the presence of unsaturated fluorinated hydrocarbons, and it is particularly difficult to prevent deterioration of nylon.

It is an object of the present invention to provide a refrigerating machine oil, and a working fluid composition for a refrigerator machine, that has excellent stability in the presence of unsaturated fluorinated hydrocarbon refrigerants, and that can prevent deterioration of polyamide resins such as nylon that are used in refrigerant circulation cycles.

The present invention provides a working fluid composition for a refrigerator machine comprising:

a base oil containing an ether-based compound, a carbodiimide compound, and an unsaturated fluorinated hydrocarbon refrigerant.

The present invention further provides a refrigerating machine oil comprising:

a base oil containing an ether-based compound, and a carbodiimide compound, the refrigerating machine oil being used together with an unsaturated fluorinated hydrocarbon refrigerant.

The working fluid composition for a refrigerator machine of the present invention may contain at least one compound selected from among 1,2,3,3,3-pentafluoropropene, 1,3,3,3-tetrafluoropropene, 2,3,3,3-tetrafluoropropene, 1,2,3,3-tetrafluoropropene and 3,3,3-trifluoropropene, as the unsaturated fluorinated hydrocarbon refrigerant.

The working fluid composition for a refrigerator machine of the present invention may comprise the at least one unsaturated fluorinated hydrocarbon refrigerant (hereunder referred to as "refrigerant (A)") alone. The working fluid composition may further comprise at least one refrigerant selected from among saturated hydrofluorocarbon, C3-5 hydrocarbon, dimethyl ether, carbon dioxide, bis(trifluoromethyl)sulfide and trifluoroiodomethane refrigerants (hereunder referred to as "refrigerant (B)").

In a refrigerant mixture comprising refrigerant (A) and refrigerant (B), the unsaturated fluorinated hydrocarbon refrigerant may be at least one selected from among 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye) and 3,3,3-trifluoropropene (HFO-1243zf) refrigerants. The saturated hydrofluorocarbon may be one or more selected from among difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365mfc); and the C3-5 hydrocarbon may be at least one selected from among propane, normal-butane, isobutane, 2-methylbutane and normal-pentane.

As mentioned above, the present invention can provide, a refrigerating machine oil and a working fluid composition for a refrigerator machine that have excellent stability in the presence of unsaturated fluorinated hydrocarbon refrigerants and can prevent deterioration of polyamide resins such as nylon that are used in refrigerant circulation cycles.

DESCRIPTION OF THE PREFERRED EMBODIMENTS

A preferred embodiment of the present invention will now be described in detail.

The working fluid composition for a refrigerator machine according to the embodiment comprises a base oil containing an ether-based compound (hereunder the base oil is referred to as "an ether-based compound-containing base oil"), a carbodiimide compound and an unsaturated fluorinated hydrocarbon refrigerant. The refrigerating machine oil of the embodiment comprises an ether-based compound-containing base oil and a carbodiimide compound, and it can be used together with an unsaturated fluorinated hydrocarbon refrigerant. The working fluid composition for a refrigerator machine according to the embodiment includes a working fluid composition comprising the refrigerating machine oil of the embodiment and an unsaturated fluorinated hydrocarbon refrigerant.

The ether-based compound composing the base oil for the embodiment is not particularly restricted so long as it is a compound having one or more ether bonds in the molecule. Examples of the ether-based compound include polyalkylene glycols, polyvinyl ethers, polyphenyl ethers, perfluoroethers and the like, among which polyalkylene glycols and polyvinyl ethers are preferably used.

Examples of polyalkylene glycols include compounds represented by formula (1):

$$R^1-[(OR^2)_f-OR^3]_g \quad (1)$$

wherein $R^1$ represents hydrogen, C1-10 alkyl, C2-10 acyl, or a residue of a compound having 2-8 hydroxyl groups, $R^2$ represents C2-4 alkylene, $R^3$ represents hydrogen, C1-10 alkyl or C2-10 acyl, f represents an integer of 1-80, and g represents an integer of 1-8.

In formula (1), alkyl groups represented by $R^1$ and $R^3$ may be straight-chain, branched or cyclic. The number of carbon atoms of each alkyl group is preferably 1-10 and more preferably 1-6. If the alkyl group is greater than C10, compatibility with the working medium may be reduced.

The alkyl group portions of acyl groups represented by $R^1$ and $R^3$ may also be straight-chain, branched or cyclic. The number of carbon atoms of the acyl group is preferably 2-10 and more preferably 2-6. If the acyl group is greater than C10, compatibility with the working medium may be reduced and phase separation may occur.

When the groups represented by $R^1$ and $R^3$ are both alkyl groups, or when they are both acyl groups, the groups represented by $R^1$ and $R^3$ may be the same or different. When g is 2 or greater, the groups represented by $R^1$ and $R^3$ in the same molecule may be the same or different.

When the group represented by $R^1$ is a residue of a compound having 2-8 hydroxyl groups, the compound may be either linear or cyclic.

Of the polyalkylene glycols represented by formula (1), at least one of $R^1$ and $R^3$ is preferably an alkyl group (more preferably a C1-4 alkyl group), with methyl being especially preferred from the viewpoint of compatibility with the working medium.

From the viewpoint of thermal and chemical stability, both $R^1$ and $R^3$ are preferably alkyl groups (more preferably C1-4 alkyl groups), and most preferably both are methyl groups.

From the viewpoint of facilitating production and lowering cost, one of $R^1$ and $R^3$ is an alkyl group (more preferably a C1-4 alkyl group) while the other is hydrogen, and most preferably one is methyl and the other is hydrogen.

In formula (1), $R^2$ represents a C2-4 alkylene group, specific examples of alkylene groups including ethylene, propylene and butylene. Oxyalkylene groups as repeating units represented by $OR^2$ include oxyethylene, oxypropylene and oxybutylene groups. Multiple oxyalkylene groups in the same molecule may be the same, or they may include two different oxyalkylene groups.

Among polyalkylene glycols represented by formula (1) there are preferred copolymers containing an oxyethylene group (EO) and an oxypropylene group (PO), from the viewpoint of compatibility with the working medium, and the viscosity-temperature characteristic, in which case, from the viewpoint of the seizure load and the viscosity-temperature characteristic, the proportion of oxyethylene groups of the total oxyethylene and oxypropylene groups (EO/(PO+EO)) is preferably in the range of 0.1-0.8 and more preferably in the range of 0.3-0.6.

From the viewpoint of hygroscopicity and heat and oxidation stability, the value of EO/(PO+EO) is preferably in the range of 0-0.5, more preferably in the range of 0-0.2, and most preferably 0 (i.e. a propylene oxide homopolymer).

The symbol "f" in formula (1) represents the number of repeating units of oxyalkylene groups $OR^2$ (polymerization degree), and it is an integer of 1-80. Also, g is an integer of 1-8. For example, when $R^1$ is an alkyl group or acyl group, g is 1. When $R^1$ is a residue of a compound having 2-8 hydroxyl groups, g is the number of hydroxyl groups in the compound.

There are no particular restrictions on the product of f and g (f×g), but the average value of f×g is preferably 6-80, to provide a satisfactory balance of required performance as a lubricant oil for a refrigerator machine.

The number-average molecular weight of the polyalkylene glycol represented by formula (1) is preferably 500-3000, more preferably 600-2000 and even more preferably 600-1500, and n is preferably a number such that the number-average molecular weight of the polyalkylene glycol satisfies the condition mentioned above. If the number-average molecular weight of the polyalkylene glycol is too low, the lubricity may be insufficient in the copresence of an unsaturated fluorinated hydrocarbon refrigerant. If the number-average molecular weight is too high, on the other hand, the compositional range exhibiting compatibility with unsaturated fluorinated hydrocarbon refrigerants under low temperature conditions will be narrowed, potentially resulting in poor refrigerant compressor lubrication or hindered evaporator heat exchange. The ratio of the weight-average molecular weight (Mw) and number-average molecular weight (Mn) (Mw/Mn) in the polyalkylene glycol represented by formula (1) is preferably no greater than 1.00-1.20. If Mw/Mn is greater than 1.20, the compatibility between the unsaturated fluorinated hydrocarbon refrigerant and refrigerating machine oil will tend to be insufficient.

Among the polyalkylene glycols mentioned above, polypropyleneglycol dimethyl ether represented by formula (2) and polyethylenepolypropyleneglycol dimethyl ether represented by formula (3) are preferred from the viewpoint of economy and effect, while polypropyleneglycol monobutyl ether represented by formula (4), polypropyleneglycol monomethyl ether represented by formula (5), polyethylenepolypropyleneglycol monomethyl ether represented by formula (6), polyethylenepolypropyleneglycol monobutyl ether represented by formula (7) and polypropyleneglycol diacetate represented by formula (8) are preferred from the viewpoint of economy.

$$CH_3O—(C_3H_6O)_h—CH_3 \quad (2)$$

wherein h represents an integer of 6-80.

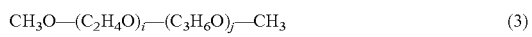

$$CH_3O—(C_2H_4O)_i—(C_3H_6O)_j—CH_3 \quad (3)$$

wherein i and j are each 1 or greater, and are numbers such that the total of i and j is 6-80.

$$C_4H_9O—(C_3H_6O)_k—H \quad (4)$$

wherein k represents an integer of 6-80.

$$CH_3O—(C_3H_6O)_l—H \quad (5)$$

wherein l represents an integer of 6-80.

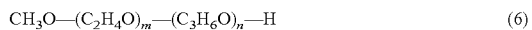

$$CH_3O—(C_2H_4O)_m—(C_3H_6O)_n—H \quad (6)$$

wherein m and n are each 1 or greater, and are numbers such that the total of m and n is 6-80.

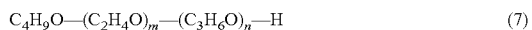

$$C_4H_9O—(C_2H_4O)_m—(C_3H_6O)_n—H \quad (7)$$

wherein m and n are each 1 or greater, and are numbers such that the total of m and n is 6-80.

$$CH_3COO—(C_3H_6O)_l—COCH_3 \quad (8)$$

wherein, l represents an integer of 6-80.

According to the embodiment, the polyalkylene glycol used may be a polyalkyleneglycol derivative having at least one structural unit represented by formula (9):

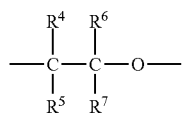

(9)

wherein $R^4$-$R^7$ may be the same or different, and each represents hydrogen, a C1-10 monovalent hydrocarbon group or a group represented by formula (10):

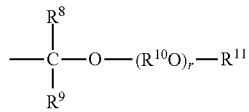

(10)

wherein $R^8$ and $R^9$ may be the same or different and each represents hydrogen, a C1-10 monovalent hydrocarbon group or a C2-20 alkoxyalkyl group, $R^{10}$ represents C2-5 alkylene, a total C2-5 substituted alkylene group having an alkyl group as a substituent, or a total C4-10 substituted alkylene group having an alkoxyalkyl group as a substituent, r represents an integer of 0-20, and $R^{11}$ represents a C1-10 monovalent hydrocarbon group), and at least one of $R^4$-$R^7$ is a group represented by formula (10).

In formula (9), $R^4$-$R^7$ each represent hydrogen, a C1-10 monovalent hydrocarbon group or a group represented by formula (10), and specific C1-10 monovalent hydrocarbon groups include C1-10 straight-chain or branched alkyl, C2-10 straight-chain or branched alkenyl, C5-10 cycloalkyl or alkylcycloalkyl, C6-10 aryl or alkylaryl and C7-10 arylalkyl groups. Preferred among these monovalent hydrocarbon groups are monovalent hydrocarbons having a carbon number of 6 or less and especially alkyl groups having a carbon number of 3 or less, and specifically methyl, ethyl, n-propyl and isopropyl.

In formula (10), $R^8$ and $R^9$ each represent hydrogen, a C1-10 monovalent hydrocarbon group or a C2-20 alkoxyalkyl group, with alkyl groups having a carbon number of 3 or less or alkoxyalkyl groups having a carbon number of 6 or less being preferred.

In formula (10), $R^{10}$ represents C2-5 alkylene, a total C2-5 substituted alkylene group having an alkyl group as a substituent, or a total C4-10 substituted alkylene group having an alkoxyalkyl group as a substituent, and preferably it represents C2-4 alkylene or a total ≤C6 substituted ethylene group.

Also in formula (10), $R^{11}$ represents a C1-10 monovalent hydrocarbon group, where the hydrocarbon group may be, specifically, C1-10 straight-chain or branched alkyl, C2-10 straight-chain or branched alkenyl, C5-10 cycloalkyl or alkylcycloalkyl, C6-10 aryl or alkylaryl, or C7-10 arylalkyl. Of these there are preferred monovalent hydrocarbon groups having a carbon number of 6 or less, and especially alkyl groups having a carbon number of 3 or less.

In formula (9), at least one of $R^4$-$R^7$ is a group represented by formula (10). Most preferably, one of $R^4$ and $R^6$ is a group represented by formula (10) while the other of $R^4$ and $R^6$, and groups $R^5$ and $R^7$, are each hydrogen or a C1-10 monovalent hydrocarbon group.

Polyalkylene glycols having structural units represented by formula (9), that are preferably used for the embodiment, may be largely classified into 3 types: homopolymers composed entirely of structural units represented by formula (9); copolymers composed of 2 or more different structural units represented by formula (9) and having different structures; and copolymers composed of structural units represented by formula (9) and other structural units (for example, structural units represented by formula (11)). Preferred examples of the aforementioned homopolymers include those having 1-200 structural units A represented by formula (9), and having hydroxyl, C1-10 acyloxy, C1-10 alkoxy or aryloxy groups as the end groups.

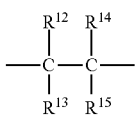

(11)

wherein $R^{12}$-$R^{15}$ may be the same or different and each represents hydrogen or a C1-3 alkyl group.

Preferred examples of copolymers, on the other hand, include those having 1-200 each of two different structural units A and B represented by formula (9), or having 1-200 structural units A represented by formula (9) and 1-200 structural units C represented by formula (10), and having hydroxyl, C1-10 acyloxy, C1-10 alkoxy or aryloxy groups as the end groups.

These copolymers may have any polymerization form, such as alternating copolymerization, random copolymerization or block copolymerization of structural unit A and structural unit B (or structural unit C), or graft copolymerization with structural unit B grafted onto a main chain of structural unit A.

There are no particular restrictions on the hydroxyl value of the polyalkylene glycol, but it is preferably no greater than 100 mgKOH/g, more preferably no greater than 50 mgKOH/g, even more preferably no greater than 30 mgKOH/g and most preferably no greater than 10 mgKOH/g.

The polyalkylene glycol of the embodiment can be synthesized by a method known in the prior art ("Alkylene Oxide Polymers", Shibata, M., Kaibundo, Nov. 20, 1990). For example, addition polymerization may be carried out between one or more specified alkylene oxides and an alcohol ($R^1OH$: $R^1$ having the same definition as $R^1$ in formula (1) above), and the terminal hydroxyl groups etherified or esterified to obtain a polyalkylene glycol of formula (1) above. When two or more different alkylene oxides are used in the production step described above, the obtained polyalkylene glycol may be either a random copolymer or block copolymer, but it is preferably a block copolymer for more excellent oxidation stability or preferably a random copolymer for a superior low temperature flow property.

Examples of polyvinyl ethers to be used for the embodiment include polyvinyl ether-based compounds having structural units represented by formula (12):

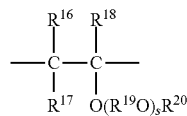

(12)

wherein $R^{16}$-$R^{18}$ may be the same or different and each represents hydrogen or a C1-8 hydrocarbon group, $R^{19}$ represents a C1-10 divalent hydrocarbon group or C2-20 divalent ether bonded oxygen-containing hydrocarbon group, $R^{20}$ represents a C1-20 hydrocarbon group, s represents an integer with an average value of 0-10, $R^{16}$-$R^{20}$ be the same or different for each structural unit, and when the structural unit represented by formula (12) has multiple $R^{19}O$ groups, the $R^{19}O$ groups may be the same or different.

There may also be used polyvinyl ether-based compounds comprising block copolymers or random copolymers having a structural unit represented by formula (12) and a structural unit represented by formula (13):

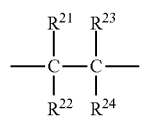

(13)

wherein $R^{21}$-$R^{24}$ may be the same or different and each represents hydrogen or a C1-20 hydrocarbon group, and $R^{21}$-$R^{24}$ may be the same or different for each structural unit.

In formula (12), each of $R^{16}$-$R^{18}$ represents hydrogen or a C1-8 hydrocarbon group (preferably 1-4 hydrocarbon group), which may be the same or different from each other. Such hydrocarbon groups include alkyl, cycloalkyl, aryl and arylalkyl groups, but hydrogen is preferred for $R^{16}$-$R^{18}$.

The group $R^{19}$ in formula (12) represents a C1-10 (preferably C2-10) divalent hydrocarbon group or a C2-20 divalent ether bonded oxygen-containing hydrocarbon group. C1-10 divalent hydrocarbon groups include divalent aliphatic-chain hydrocarbons, alicyclic hydrocarbon groups having 2 binding sites on the alicyclic hydrocarbon, divalent aromatic hydrocarbon groups, and alkylaromatic hydrocarbon groups. C2-4 aliphatic-chain hydrocarbon groups are particularly preferred.

Specific preferred examples of C2-20 divalent ether bonded oxygen-containing hydrocarbon groups include methoxymethylene, methoxyethylene, methoxymethylethylene, 1,1-bismethoxymethylethylen 1,2-bismethoxymethylethylene, ethoxymethylethylene, (2-methoxyethoxy)methylethylene and (1-methyl-2-methoxy)methylethylene. The symbol s in formula (12) represents the number of repeating $R^{19}O$ groups, and its average value is in the range of 0-10 and preferably 0-5. When multiple $R^{19}O$ groups are present in the same structural unit, the $R^{19}O$ groups may be the same or different.

The group $R^{20}$ in formula (12) represents a C1-20 and preferably C1-10 hydrocarbon group, where the hydrocarbon group may be alkyl, cycloalkyl, aryl, arylalkyl or the like. The $R^{16}$-$R^{20}$ groups may be the same or different for each structural unit.

When the polyvinyl ether of the embodiment is a homopolymer composed entirely of structural units represented by formula (12), the carbon/oxygen atomic ratio is preferably in the range of 4.2-7.0. If the atomic ratio is less than 4.2 the hygroscopicity will tend to be excessively increased, and if it is greater than 7.0 the compatibility with the working medium will tend to be reduced.

In formula (13), $R^{21}$-$R^{24}$ may be the same or different and each represents hydrogen or a C1-20 hydrocarbon group.

C1-20 hydrocarbon groups include the hydrocarbon groups mentioned above for $R^{20}$ in formula (12).

The $R^{21}$-$R^{24}$ groups may be the same or different for each structural unit.

When the polyvinyl ether of the embodiment is a block copolymer or random copolymer comprising a structural unit represented by formula (12) and a structural unit represented by formula (13), the carbon/oxygen atom ratio is preferably in the range of 4.2-7.0. If the atomic ratio is less than 4.2 the hygroscopicity will tend to be excessively increased, and if it is greater than 7.0 the compatibility with the working medium will tend to be reduced.

For the embodiment it is also possible to use a mixture of a homopolymer composed entirely of a structural unit represented by formula (12), with a block copolymer or random copolymer comprising a structural unit represented by formula (12) and a structural unit represented by formula (13). The homopolymer and copolymer may be produced, respectively, by polymerization of their corresponding vinyl ether-based monomers, and by copolymerization of corresponding hydrocarbon monomers having olefinic double bonds and vinyl ether-based monomers.

Preferred polyvinyl ethers to be used for the embodiment are those having a structure wherein one of the end structures is represented by formula (14) or (15) and the other is represented by formula (16) or (17); and those having a structure wherein one of the end structures is represented by formula (14) or (15) and the other is represented by formula (18).

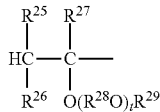  (14)

wherein $R^{25}$-$R^{27}$ may be the same or different and each represents hydrogen or a C1-8 hydrocarbon group, $R^{28}$ represents a C1-10 divalent hydrocarbon group or C2-20 divalent ether bonded oxygen-containing hydrocarbon group, $R^{29}$ represents a C1-20 hydrocarbon group, t represents an integer with an average value of 0-10, and when the end structure represented by formula (14) has multiple $R^{28}O$ groups, the $R^{28}O$ groups may be the same or different.

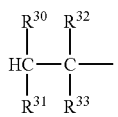  (15)

wherein $R^{30}$-$R^{33}$ may be the same or different and each represents hydrogen or a C1-20 hydrocarbon group.

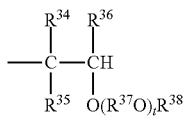  (16)

wherein $R^{34}$-$R^{36}$ may be the same or different and each represents hydrogen or a C1-8 hydrocarbon group, $R^{37}$ represents a C1-10 divalent hydrocarbon group or C2-20 divalent ether bonded oxygen-containing hydrocarbon group, $R^{38}$ represents a C1-20 hydrocarbon group, t represents an integer with an average value of 0-10, and when the end structure represented by formula (16) has multiple $R^{37}O$ groups, the $R^{37}O$ groups may be the same or different.

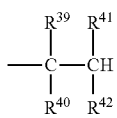  (17)

wherein $R^{39}$-$R^{42}$ may be the same or different and each represents hydrogen or a C1-20 hydrocarbon group.

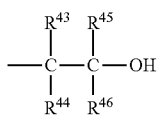  (18)

wherein $R^{43}$-$R^{46}$ may be the same or different and each represents hydrogen or a C1-8 hydrocarbon group.

Particularly preferred among these polyvinyl ethers are the following.

(i) Those having a structure wherein one end is represented by formula (14) or (15) and the other is represented by formula (16) or (17), all of $R^{16}$-$R^{18}$ in formula (12) are hydrogen, s is an integer of 0-4, $R^{19}$ is a C2-4 divalent hydrocarbon group, and $R^{20}$ is a C1-20 hydrocarbon group;

(ii) Those having only a structural unit represented by formula (12), and having a structure wherein one end is represented by formula (14) and the other is represented by formula (15), all of $R^{16}$-$R^{18}$ in formula (12) are hydrogen, s is an integer of 0-4, $R^{19}$ is a C2-4 divalent hydrocarbon group, and $R^{20}$ is a C1-20 hydrocarbon group;

(iii) Those having a structure wherein one end is represented by formula (14) or (15) and the other is represented by formula (16), all of $R^{16}$-$R^{18}$ in formula (12) are hydrogen, s is an integer of 0-4, $R^{19}$ is a C2-4 divalent hydrocarbon group, and $R^{20}$ is a C1-20 hydrocarbon group;

(iv) Those having only a structural unit represented by formula (12), and having a structure wherein one end is represented by formula (14) and the other is represented by formula (17), all of $R^{16}$-$R^{18}$ in formula (12) are hydrogen, s is an integer of 0-4, $R^{19}$ is a C2-4 divalent hydrocarbon group, and $R^{20}$ is a C1-20 hydrocarbon group.

According to the embodiment there may also be used a polyvinyl ether-based compound having a structural unit represented by formula (15), and having a structure wherein one end is represented by formula (17) and the other end is represented by formula (19).

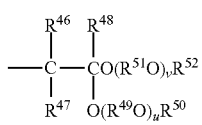  (19)

wherein $R^{46}$-$R^{48}$ may be the same or different and each represents hydrogen or a C1-8 hydrocarbon group, $R^{49}$ and $R^{51}$ may be the same or different and each represents a C2-10 divalent hydrocarbon group, $R^{50}$ and $R^{52}$ may be the same or different and each represents a C1-10 hydrocarbon group, u and v may be the same or different and each represents an integer with an average value of 0-10, and when the end structure represented by formula (19) has multiple $R^{49}O$ groups or $R^{51}O$ groups, the $R^{49}O$ or $R^{51}O$ groups may be the same or different.

There may also be used, according to the embodiment, a polyvinyl ether-based compound composed of an alkylvinyl ether homopolymer or copolymer comprising a structural unit represented by formula (20) or (21) and having a weight-average molecular weight of 300-5000, wherein one end has a structure represented by formula (22) or (23).

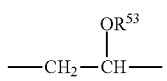  (20)

wherein $R^{53}$ represents a C1-8 hydrocarbon group.

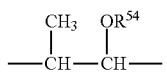  (21)

wherein $R^{54}$ represents a C1-8 hydrocarbon group.

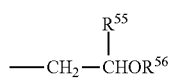
(22)

wherein $R^{55}$ represents a C1-3 alkyl group and $R^{56}$ represents a C1-8 hydrocarbon group.

(23)

wherein $R^{57}$ represents a C1-8 hydrocarbon group.

There are no particular restrictions on the hydroxyl value but it is preferably 10 mgKOH/g or less, more preferably 5 mgKOH/g or less and even more preferably 3 mgKOH/g or less.

The kinematic viscosity at 100° C. of the polyalkylene glycol and polyvinyl ether of the embodiment is preferably 4-50 mm$^2$/s, more preferably 5-40 mm$^2$/s, even more preferably 6-30 mm$^2$/s, yet more preferably 7-25 mm$^2$/s and most preferably 8-20 mm$^2$/s. If the kinematic viscosity 100° C. is too low the lubricity in the copresence of refrigerants will be insufficient, and if it is too high, the compositional range exhibiting compatibility with refrigerants will be narrowed, potentially resulting in poor refrigerant compressor lubrication or hindered evaporator heat exchange. The kinematic viscosity at 40° C. of the polyalkylene glycol and polyvinyl ether is preferably 5-1000 mm$^2$/s and more preferably 10-500 mm$^2$/s. If the kinematic viscosity at 40° C. is too low the lubricity and compressor sealability will tend to be reduced, and if it is too high, the compositional range exhibiting compatibility with refrigerants under low temperature conditions will be narrowed, potentially resulting in poor refrigerant compressor lubrication or hindered evaporator heat exchange.

The pour point of the polyalkylene glycol represented by formula (1) and the polyvinyl ether is preferably no higher than −10° C., and more preferably between −20 and −50° C. If a polyalkylene glycol with a pour point of above −10° C. is used, the refrigerating machine oil will tend to solidify more easily in the refrigerant circulation system at low temperature.

In the production steps for the polyalkylene glycol and polyvinyl ether for the embodiment, alkylene oxides such as propylene oxide will sometimes undergo secondary reactions forming unsaturated groups such as allyl groups in the molecule. When unsaturated groups are formed in the polyalkylene glycol molecule, the thermostability of the polyalkylene glycol itself is lowered and polymers are generated causing formation of sludge, or the resistance to oxidation (antioxidation) tends to be reduced, resulting in production of peroxides. Particularly when peroxides are produced, they decompose and generate carbonyl group-containing compounds, and the carbonyl group-containing compounds are a source of sludge that can cause capillary clogging.

Therefore, the polyalkylene glycol and polyvinyl ether of the embodiment preferably has a low degree of unsaturation due to unsaturated groups and the like, and more specifically, a degree of unsaturation of no greater than 0.04 meq/g, more preferably no greater than 0.03 meq/g and even more preferably no greater than 0.02 meq/g. The peroxide number is preferably no greater than 10.0 meq/kg, more preferably no greater than 5.0 meq/kg and even more preferably no greater than 1.0 meq/kg. The carbonyl value is preferably no greater than 100 ppm by mass, more preferably no greater than 50 ppm by mass, and most preferably no greater than 20 ppm by mass.

The degree of unsaturation, peroxide number and carbonyl number according to the present invention are the values measured according to the Standard Methods for the Analysis of Fats, Oils and Related Materials, established by the Japan Oil Chemists' Society. Specifically, the degree of unsaturation according to the present invention is the value (meq/g) obtained by reacting Wijs solution (ICl-acetic acid solution) with a sample, allowing the reaction mixture to stand in a dark area, subsequently reducing the excess ICl to iodine, titrating the iodine portion with sodium thiosulfate and calculating the iodine value, and then converting the iodine value to vinyl equivalents; the peroxide number according to the present invention is the value (meq/kg) obtained by adding potassium iodide to a sample, titrating the produced free iodine with sodium thiosulfate, and converting the free iodine to milliequivalents with respect to 1 kg of sample; and the carbonyl value according to the present invention is the value (ppm by mass) obtained by allowing 2,4-dinitrophenylhydrazine to act on a sample to produce colorable quinoid ion, measuring the absorbance of the sample at 480 nm, and converting it to carbonyl content based on a predetermined calibration curve with cinnamaldehyde as the standard substance.

For production of a polyalkylene glycol, it is preferred for the reaction temperature to be no higher than 120° C. (more preferably no higher than 110° C.) during reaction of the propylene oxide, in order to obtain a polyalkylene glycol with a low degree of unsaturation, peroxide number and carbonyl number. When an alkali catalyst is used for production, the degree of unsaturation can be reduced by removing it using an inorganic adsorbent such as active carbon, active white clay, bentonite, dolomite or aluminosilicate. Increase in the peroxide number or carbonyl number can also be prevented by maximally avoiding contact with oxygen or by adding an antioxidant during production or use of the polyalkylene glycol.

In a refrigerator fluid composition according to the embodiment, an ether-based compound may be used alone as the base oil, but if necessary another base oil or additive, such as mentioned below, may be added. The ether-based compound content in the refrigerating machine oil of the embodiment is not particularly restricted, but it is preferably 50% by mass or greater, more preferably 70% by mass or greater, even more preferably 80% by mass or greater and most preferably 90% by mass or greater, based on the total amount of the refrigerating machine oil.

There are no particular restrictions on the content of the ether-based compound in the refrigerating machine oil of the embodiment, but for more excellent performance including lubricity, refrigerant compatibility, thermal/chemical stability and electrical insulating properties, the content is preferably at least 50% by mass, more preferably at least 70% by mass, even more preferably at least 80% by mass and most preferably at least 90% by mass, based on the total amount of the refrigerating machine oil.

The working fluid composition for a refrigerator machine and refrigerating machine oil of the embodiment may be used in a form in which the base oil containing the ether-based compound mentioned above comprises a carbodiimide compound, with various additives also included as necessary. In the explanation which follows, the additive contents are given based on the total amount of the refrigerating machine oil, and the contents of these components in the refrigerator fluid composition are preferably selected to be within the preferred ranges specified below, based on the total amount of the refrigerating machine oil.

Carbodiimide compounds to be used for the embodiment include compounds having the structure represented by formula (24).

$$R^{58}-N=C=N-R^{59} \quad (24)$$

(In the formula, $R^{58}$ and $R^{59}$ may be the same or different and each represents hydrogen, a hydrocarbon, or a hydrocarbon group that contains a nitrogen atom or oxygen atom.)

Preferred examples of carbodiimide compounds include compounds of formula (24) wherein $R^{58}$ and $R^{59}$ are hydrogen, C1-12 straight-chain or branched aliphatic hydrocarbon groups or C6-18 aromatic or aromatic-aliphatic hydrocarbon groups. More specifically, these include compounds of formula (24) wherein $R^{58}$ and $R^{59}$ are each hydrogen, an alkyl group such as methyl, ethyl, n-propyl, isopropyl, n-butyl, 1-methylpropyl, 2-methylpropyl, 3-methylpropyl, n-pentyl, 1-methylbutyl, 2-methylbutyl, 3-methylbutyl, 4-methylbutyl, 1,1-dimethylpropyl, 2,2-dimethylpropyl, 1,2-dimethylpropyl, 2,3-dimethylpropyl, 1-ethylpropyl, 2-ethylpropyl, any hexyl, any heptyl, any octyl, 2-ethylhexyl, any nonyl, any decyl, any undecyl or any dodecyl, an alkenyl group such as propenyl, butenyl, isobutenyl, pentenyl, 2-ethylhexenyl or octenyl, a cycloalkyl group such as cyclopentyl, cyclohexyl, methylcyclopentyl or ethylcyclopentyl, an aryl group such as phenyl or naphthyl, an alkyl-substituted phenyl group such as toluoyl, isopropylphenyl, diisopropylphenyl, triisopropylphenyl or nonylphenyl, or an aralkyl group such as benzyl or phenethyl.

From the viewpoint of the stability-improving effect in the presence of unsaturated fluorinated hydrocarbon refrigerants, the $R^{58}$ and $R^{59}$ groups of these carbodiimide compounds are preferably C3-6 alkyl groups, as aliphatic hydrocarbon groups, or C6-15 aryl and alkyl-substituted phenyl groups, as aromatic and aromatic-aliphatic hydrocarbon groups. Specifically, these include propyl, isopropyl, butyl, isobutyl, pentyl, 2-methylbutyl, hexyl, phenyl, toluoyl, isopropylphenyl, diisopropylphenyl and triisopropylphenyl.

Carbodiimide compounds to be used for the embodiment include those wherein $R^{58}$ and $R^{59}$ in formula (24) have substituents represented by formula (25). In this case, $R^{58}$ and $R^{59}$ may be the same or different.

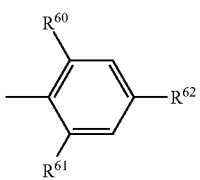

(25)

wherein $R^{60}$, $R^{61}$ and $R^{62}$ each represent hydrogen or a C1-10 alkyl group.

In formula (25), $R^{60}$, $R^{61}$ and $R^{62}$ may be hydrogen or a C1-10 alkyl group, examples of which include hydrogen, methyl, ethyl, propyl, isopropyl, butyl, isobutyl, t-butyl, pentyl, isopentyl, hexyl, isohexyl, heptyl, isoheptyl, octyl, isooctyl, 2-ethylhexyl, nonyl, isononyl, 3,5,5-trimethylhexyl, decyl and isodecyl. From the viewpoint of the stability-improving effect in refrigerant atmospheres, preferably $R^{60}$, $R^{61}$ and $R^{62}$ are selected so that their total is no greater than C12, with hydrogen, methyl, ethyl, propyl, isopropyl, butyl, isobutyl and t-butyl being especially preferred.

A carbodiimide compound having at least 2 carbodiimide groups (—N=C=N—) in the molecule may also be used for the embodiment. Preferred examples of such compounds include those represented by formula (26).

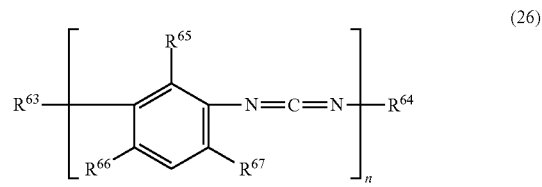

(26)

wherein $R^{63}$ represents hydrogen or a C1-10 alkyl group, $R^{64}$ represents hydrogen, a C1-10 alkyl group or a group represented by formula (25), when $R^{64}$ is a group represented by formula (25), the total number of carbon atoms of $R^{60}$, $R^{61}$ and $R^{62}$ is no greater than 10, $R^{65}$, $R^{66}$ and $R^{67}$ may be the same or different and each represents hydrogen or a C1-10 alkyl group, the total number of carbon atoms of $R^{65}$, $R^{66}$ and $R^{67}$ is no greater than 10, and n is an integer of 2 or greater.

The total number of carbon atoms of $R^{60}$, $R^{61}$ and $R^{62}$ is preferably not greater than 10 when $R^{64}$ is a group represented by formula (25), because the solubility for ether oils and unsaturated fluorinated hydrocarbon refrigerants will tend to be impaired. Similarly, the total number of carbon atoms of $R^{65}$, $R^{66}$ and $R^{67}$ is preferably not greater than 10, because the solubility for ether oils and unsaturated fluorinated hydrocarbon refrigerants will tend to be impaired.

Specific examples of C1-10 alkyl groups represented by $R^{60}$, $R^{61}$, $R^{62}$, $R^{65}$, $R^{66}$ and $R^{67}$ include methyl, ethyl, isopropyl, propyl, butyl, isobutyl, pentyl, hexyl, heptyl, 2-ethylhexyl, nonyl and isodecyl. Particularly preferred among these are methyl, ethyl, isopropyl and propyl, from the viewpoint of solubility with ether-based compound-containing base oils and unsaturated fluorinated hydrocarbon refrigerants.

The letter n in formula (26) represents an integer of 2 or greater. Since the solubility with ether-based compound-containing base oils and/or unsaturated fluorinated hydrocarbon refrigerants will tend to decrease as the value of n increases, n is preferably 2-6 and more preferably 2-3.

Most generally preferred among the carbodiimide compounds represented by formula (26) are bis(isopropylphenyl)carbodiimide, bis(diisopropylphenyl)carbodiimide and bis(triisopropylphenyl)carbodiimide, from the viewpoint of stability and compatibility with new oils (unused oils) or degraded oils (used oil), reactivity with acidic substances, and stability and compatibility with reaction products of acidic substances, in the copresence of ether oils or unsaturated fluorinated hydrocarbon refrigerants.

The carbodiimide compound content may be as desired, but is preferably in the range of 0.005-3% by mass, more preferably 0.007-1% by mass and most preferably 0.01-0.1% by mass, based on the total amount of the refrigerating machine oil. If the carbodiimide compound content is less than this lower limit, it may not be possible to obtain a satisfactory effect. Also, increasing the content above the upper limit will tend to produce no further effect commensurate with the content, and can instead result in inconveniences such as poor lubricity.

In the working fluid composition for a refrigerator machine and refrigerating machine oil of the embodiment, the base oil may be composed entirely of an ether-based compound, or it may further contain base oils other than ether-based compounds.

Base oils other than ether-based compounds that may be used include mineral oils, hydrocarbon-based oils such as an olefin polymers, naphthalene compounds and alkylbenzenes, and oxygen-containing synthetic oils including esoteric base oils (monoesters, diesters, polyol esters and the like), ketones, silicones and polysiloxanes. Polyol esters are preferably used among the aforementioned oxygen-containing synthetic oils.

The refrigerating machine oil and working fluid composition for a refrigerator machine of the embodiment preferably contain an amine-based antioxidant. Amine-based antioxidants include phenyl-α-naphthylamines represented by formula (27), and p,p'-dialkylated diphenylamines represented by formula (28).

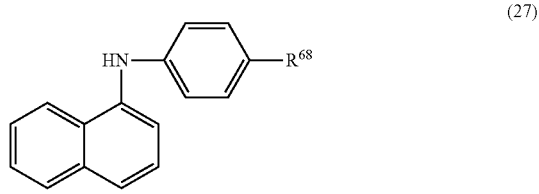

(27)

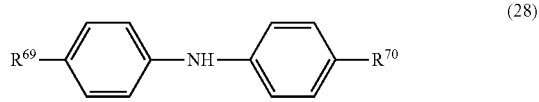

(28)

In formula (27), $R^{68}$ represents hydrogen or a C1-16 alkyl group. Also, in formula (28), $R^{69}$ and $R^{70}$ may be the same or different and each represents a C1-16 alkyl group.

When $R^{68}$ in formula (27) is a C1-16 alkyl group, preferably $R^{68}$ is a C8-16 branched alkyl group, and more preferably a C8-16 branched alkyl group derived from a C3 or C4 olefin oligomer, since this will allow a superior anti-sludge effect to be obtained. Specific C3 or C4 olefins include propylene, 1-butene, 2-butene and isobutylene, with propylene or isobutylene being preferred in order to obtain a superior anti-sludge effect. For an even greater anti-sludge effect, $R^{68}$ is more preferably a branched octyl group derived from an isobutylene dimer, a branched nonyl group derived from a propylene trimer, a branched dodecyl group derived from an isobutylene trimer, a branched dodecyl group derived from a propylene tetramer or a branched pentadecyl group derived from a propylene pentamer, it is even more preferably a branched octyl group derived from an isobutylene dimer, a branched dodecyl group derived from an isobutylene trimer or a branched dodecyl group derived from a propylene tetramer, and it is most preferably a branched dodecyl group.

Also, in order to obtain an even greater anti-sludge effect, $R^{69}$ and $R^{70}$ in formula (28) are each preferably a C3-16 branched alkyl group, and more preferably a C3-16 branched alkyl group derived from a C3 or C4 olefin or its oligomer. Specific C3 or C4 olefins include propylene, 1-butene, 2-butene and isobutylene, with propylene or isobutylene being preferred in order to obtain an even greater anti-sludge effect.

Also, in order to obtain an even greater anti-oxidant effect, $R^{69}$ and $R^{70}$ are most preferably a tert-butyl group derived from isobutylene, or a branched octyl group derived from an isobutylene dimer.

The p,p'-dialkyldiphenylamine represented by formula (28) may be a commercially available product or a synthesized product. A synthesized product can be easily synthesized by reaction between a C1-16 alkyl halide compound and a diphenylamine or between a C2-16 olefin or its oligomer and a diphenylamine, using a Friedel-Crafts catalyst, similar to a phenyl-α-naphthylamine represented by formula (27), and any synthesis method may be used.

The amine-based antioxidant content is preferably no greater than 2% by mass, more preferably no greater than 1.5% by mass and even more preferably no greater than 1% by mass, based on the total amount of the refrigerating machine oil. The content preferably does not exceed 2% by mass, as this can lead to sludge generation. The amine-based antioxidant content is also preferably 0.001% by mass or greater, more preferably 0.05% by mass or greater and even more preferably 0.1% by mass or greater, based on the total amount of the refrigerating machine oil. The amine-based antioxidant content is preferably not less than 0.001% by mass, as this will result in an insufficient anti-oxidant effect.

By adding the aforementioned amine-based antioxidant in addition to a carbodiimide compound, it will be possible to prevent oxidative degradation of the refrigerating machine oil while also minimizing adverse effects on the organic material in the refrigerating cycle described below. In particular, it will be possible to minimize degradation of polyamide resin layers on the innermost layers of flexible hoses.

In order to further enhance the abrasion resistance and load resistance of the working fluid composition for a refrigerator machine and the refrigerating machine oil of the embodiment, there may be added one or more phosphorus compounds selected from the group consisting of phosphoric acid esters, acidic phosphoric acid esters, thiophosphoric acid esters, acidic phosphoric acid ester amine salts, chlorinated phosphoric acid esters and phosphorous acid esters. These phosphorus compounds are esters of phosphoric acid or phosphorous acid with alkanols or polyether alcohols, or derivatives thereof.

Specific examples of phosphoric acid esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, xylenyldiphenyl phosphate, tris (isopropylphenyl)phosphate and tris(t-butylphenyl)phosphate.

Acidic phosphoric acid esters include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate.

Thiophosphoric acid esters include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate and xylenyldiphenyl phosphorothionate.

Acidic phosphoric acid ester amine salts include amine salts of acidic phosphoric acid esters and C1-24 and preferably C5-18 primary to tertiary straight-chain or branched alkyl group amines.

Amines composing amine salts of acidic phosphoric acid esters include straight-chain and branched amines such as methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, oleylamine, tetracosylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, dioleylamine, ditetracosylamine, trimethylamine, triethylamine, tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine, triheptadecylamine, trioctadecylamine, trioleylamine and tritetracosylamine. The amine may be a simple compound or a mixture of two or more different compounds.

As chlorinated phosphoric acid esters there may be mentioned tris(dichloropropyl) phosphate, tris(chloroethyl) phosphate, tris(chlorophenyl) phosphate, and polyoxyalkylene bis [di(chloroalkyl)]phosphate. Phosphorous acid esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite and tricresyl phosphite. Mixtures of the above compounds may also be used.

When the working fluid composition for a refrigerator machine and refrigerating machine oil of the embodiment contain such phosphorus compounds, the phosphorus compound content is not particularly restricted but is preferably 0.001-5.0% by mass, more preferably 0.002-4.0% by mass and even more preferably 0.005-3.0% by mass, based on the total amount of the refrigerating machine oil (the total amount of the base oil and all of the additives). A single phosphorus compound may be used, or two or more may be used in combination.

The refrigerating machine oil and working fluid composition for a refrigerator machine according to the embodiment may further comprise a metal deactivator. Benzotriazole or its derivatives may be suitably used as metal deactivators.

Benzotriazole is a compound represented by formula (29).

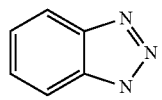

(29)

Examples of benzotriazole derivatives include alkylbenzotriazoles represented by formula (30) and (alkyl)aminoalkylbenzotriazoles represented by formula (31).

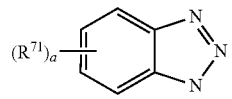

(30)

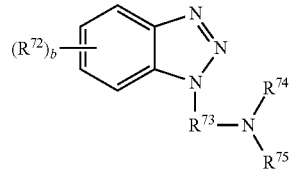

(31)

In formula (30), $R^{71}$ represents a C1-4 straight-chain or branched alkyl group and preferably methyl or ethyl, and "a" represents 1-3 and preferably 1 or 2. Examples for $R^{71}$ include methyl, ethyl, n-propyl, isopropyl, n-butyl, isobutyl, sec-butyl and tert-butyl. Particularly preferred as alkylbenzotriazoles represented by formula (30), from the viewpoint of excellent anti-oxidant properties, are compounds wherein $R^{71}$ is methyl or ethyl and "a" is 1 or 2, examples of which include methylbenzotriazole (tolyltriazole), dimethylbenzothiazole, ethylbenzotriazole, ethylmethylbenzotriazole, diethylbenzotriazole, and mixtures of the foregoing.

In formula (31), $R^{72}$ represents a C1-4 straight-chain or branched alkyl group and preferably methyl or ethyl, $R^{73}$ represents a methylene or ethylene group, $R^{74}$ and $R^{75}$ are the same or different groups and each represents hydrogen or a C1-18 straight-chain or branched alkyl group, and preferably a C1-12 straight-chain or branched alkyl group, and b represents 0-3 and preferably 0 or 1.

Examples for $R^{72}$ include methyl, ethyl, n-propyl, isopropyl, n-butyl, isobutyl, sec-butyl and tert-butyl. Groups for $R^{74}$ and $R^{75}$ include hydrogen and alkyl groups such as methyl, ethyl, propyl, isopropyl, n-butyl, isobutyl, sec-butyl, tert-butyl, pentyl, hexyl, heptyl, octyl, nonyl, decyl, undecyl, dodecyl, tridecyl, tetradecyl, pentadecyl, hexadecyl, heptadecyl and octadecyl. $R^{74}$ and $R^{75}$ may be the same or different.

Preferred as (alkyl)aminobenzotriazoles represented by formula (31), especially from the viewpoint of excellent antioxidation properties, are dialkylaminoalkylbenzotriazoles or dialkylaminoalkyltolyltriazoles, wherein $R^{72}$ is methyl, b is 0 or 1, $R^{73}$ is a methylene or ethylene group, and $R^{74}$ and $R^{75}$ are C1-12 straight-chain or branched alkyl groups, or mixtures thereof.

Examples of such dialkylaminoalkylbenzotriazoles include dimethylaminomethylbenzotriazole, diethylaminomethylbenzotriazole, dipropylaminomethylbenzotriazole, dibutylaminomethylbenzotriazole, dipentylaminomethylbenzotriazole, dihexylaminomethylbenzotriazole, diheptylaminomethylbenzotriazole, dioctylaminomethylbenzotriazole, N,N-bis(2-ethylhexyl)-methylbenzotriazole, dinonylaminomethylbenzotriazole, didecylaminomethylbenzotriazole, diundecylaminomethylbenzotriazole, didodecylaminomethylbenzotriazole; dimethylaminoethylbenzotriazole, diethylaminoethylbenzotriazole, dipropylaminoethylbenzotriazole, dibutylaminoethylbenzothiazole, dipentylaminoethylbenzotriazole, dihexylaminoethylbenzotriazole, diheptylaminoethylbenzotriazole, dioctylaminoethylbenzotriazole, dinonylaminoethylbenzotriazole, didecylaminoethylbenzotriazole, diundecylaminoethylbenzotriazole, didodecylaminoethylbenzotriazole; dimethylaminomethyltolyltriazole, diethylaminomethyltolyltriazole, dipropylaminomethyltolyltriazole, dibutylaminomethyltolyltriazole, dipentylaminomethyltolyltriazole, dihexylaminomethyltolyltriazole, diheptylaminomethyltolyltriazole, dioctylaminomethyltolyltriazole, dinonylaminomethyltolyltriazole, didecylaminomethyltolyltriazole, diundecylaminomethyltolyltriazole, didodecylaminomethyltolyltriazole; dimethylaminoethyltolyltriazole, diethylaminoethyltolyltriazole, dipropylaminoethyltolyltriazole, dibutylaminoethyltolyltriazole, dipentylaminoethyltolyltriazole, dihexylaminoethyltolyltriazole, diheptylaminoethyltolyltriazole, dioctylaminoethyltolyltriazole, dinonylaminoethyltolyltriazole, didecylaminoethyltolyltriazole, diundecylaminoethyltolyltriazole, didodecylaminoethyltolyltriazole; and mixtures of the foregoing.

When the working fluid composition for a refrigerator machine and refrigerating machine oil of the embodiment contain a metal deactivator, its content is not particularly restricted but is usually preferred to be 0.001-1.0% by mass and more preferably 0.005-0.5% by mass, based on the total amount of the refrigerating machine oil. If the metal deactivator content is less than 0.001% by mass the effect of addition may be insufficient, and if it exceeds 1.0% by mass the effect of addition will not be commensurate with the content, which is economical disadvantageous.

In order to further improve the thermal/chemical stability of the working fluid composition for a refrigerator machine and refrigerating machine oil according to the embodiment, it may contain one or more epoxy compounds selected from among phenylglycidyl ether-type epoxy compounds, alkylglycidyl ether-type epoxy compounds, glycidyl ester-type epoxy compounds, aryloxirane compounds, alkyloxirane compounds, alicyclic epoxy compounds, epoxidated fatty acid monoesters and epoxidated vegetable oils.

Specific examples of phenylglycidyl ether-type epoxy compounds include phenyl glycidyl ethers and alkylphenyl glycidyl ethers. The alkylphenyl glycidyl ethers referred to here may have 1-3 C1-13 alkyl groups, preferred examples of which include those with one C4-10 alkyl group such as n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether and decylphenyl glycidyl ether.

Specific examples of alkyl glycidyl ether-type epoxy compounds include decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropanetriglycidyl ether, pentaerythritoltetraglycidyl ether, 1,6-hexanediol diglycidyl ether, sorbitolpolyglycidyl ether, polyalkyleneglycol monoglycidyl ether and polyalkyleneglycol diglycidyl ether.

As specific examples of glycidyl ester-type epoxy compounds there may be mentioned phenylglycidyl esters, alkylglycidyl esters and alkenylglycidyl esters, among which preferred examples include glycidyl-2,2-dimethyl octanoate, glycidyl benzoate, glycidyl acrylate and glycidyl methacrylate.

Specific examples of aryloxirane compounds include 1,2-epoxystyrene and alkyl-1,2-epoxystyrenes.

Specific examples of alkyloxirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane and 1,2-epoxyeicosane.

Specific examples of alicyclic epoxy compounds include 1,2-epoxycyclohexane, 1,2-epoxycyclopentane, 3,4-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane and 4-epoxyethyl-1,2-epoxycyclohexane.

Specific examples of epoxidated fatty acid monoesters include epoxidated esters of C12-20 fatty acids and C1-8 alcohols or phenols or alkylphenols. Most preferably used are butyl, hexyl, benzyl, cyclohexyl, methoxyethyl, octyl, phenyl and butylphenyl esters of epoxystearic acid.

Specific examples of epoxidated vegetable oils include epoxy compounds of vegetable oils such as soybean oil, linseed oil and cottonseed oil.

Preferred among these epoxy compounds are phenyl glycidyl ether-type epoxy compounds, alkyl glycidyl ether-type epoxy compounds, glycidyl ester-type epoxy compounds, and alicyclic epoxy compounds.

When the working fluid composition for a refrigerator machine and refrigerating machine oil according to the embodiment contains such epoxy compounds, the epoxy compound content is not particularly restricted but is preferably 0.01-5.0% by mass and more preferably 0.1-3.0% by mass based on the total amount of the refrigerating machine oil. A single epoxy compound may be used, or two or more may be used in combination.

Conventionally known refrigerating machine oil additives may be included as necessary, in order to further increase the performance of the refrigerating machine oil and working fluid composition for a refrigerator machine of the embodiment. Examples of such additives include phenol-based antioxidants such as di-tert-butyl-p-cresol and bisphenol A, anti-wear agents such as zinc dithiophosphate and phosphorus compounds other than those of the present application, extreme-pressure agents such as chlorinated paraffins and sulfur compounds, oiliness agents such as fatty acids, antifoaming agents such as silicone-based compounds, viscosity index improvers, pour point depressants, detergent dispersants, and the like. Such additives may be used alone or in combinations of two or more. There are no particular restrictions on the content of such additives, but it is preferably no greater than 10% by mass and more preferably no greater than 5% by mass based on the total amount of the refrigerating machine oil.

The kinematic viscosity of the refrigerating machine oil of the embodiment is not particularly restricted, but the kinematic viscosity at 40° C. is preferably 3-1000 mm$^2$/s, more preferably 4-500 mm$^2$/s and most preferably 5-400 mm$^2$/s. The kinematic viscosity at 100° C. is preferably 1-100 mm$^2$/s and more preferably 2-50 mm$^2$/s.

The moisture content of the refrigerating machine oil of the embodiment is not particularly restricted but is preferably no greater than 500 ppm by mass, more preferably no greater than 300 ppm by mass and most preferably no greater than 200 ppm by mass, based on the total amount of the refrigerating machine oil. A lower moisture content is desired from the viewpoint of effect on the thermal and chemical stability and electrical insulating properties of the refrigerating machine oil, especially for use in hermetic type refrigerator machines.

The acid value of the refrigerating machine oil of the embodiment is also not particularly restricted, but in order to prevent corrosion of metals used in the refrigerator machine or pipings, and in order to prevent decomposition of the ester in the refrigerating machine oil, it is preferably no greater than 0.1 mgKOH/g and more preferably no greater than 0.05 mgKOH/g. According to the present invention, the acid value is the value measured based on JIS K2501, "Petroleum Products And Lubricant Oils—Neutralization Value Test Method".

The ash content of the refrigerating machine oil of the embodiment is not particularly restricted, but in order to increase the thermal and chemical stability of the refrigerating machine oil and inhibit generation of sludge, it is preferably no greater than 100 ppm and more preferably no greater than 50 ppm. According to the present invention, the ash content is the value measured based on JIS K2272, "Crude oil and petroleum products—Determination of ash and sulfates ash".

The working fluid composition for a refrigerator machine of the embodiment comprises an unsaturated fluorinated hydrocarbon refrigerant, and the refrigerating machine oil of the embodiment may be used together with the unsaturated fluorinated hydrocarbon refrigerant.

Preferred unsaturated fluorinated hydrocarbon refrigerants include unsaturated fluorinated hydrocarbons with 3-5 fluorine atoms, such as 1,1,2-trifluoroethene, 1,1,2-trifluoro-1-propene, 1,1,3-trifluoro-1-propene, 1,3,3-trifluoro-1-propene, 2,3,3-trifluoro-1-propene, 3,3,3-trifluoro-1-propene, 1,2,3-trifluoro-1-propene, 1,2,3,3-tetrafluoro-1-propene, 1,1,2,3-tetrafluoro-1-propene, 1,1,3,3-tetrafluoro-1-propene, cis and trans-1,3,3,3-tetrafluoropropene, 2,3,3,3-tetrafluoropropene, 1,1,1,2-tetrafluoropropene, Z- and E-1,2,3,3,3-pentafluoro-1-propene, 1,1,3,3,3-pentafluoro-1-propene, 1,1,2,3,3-pentafluoro-1-propene, 1,1,2-trifluoro-1-butene, 1,2,3-trifluoro-1-butene, 1,2,4-trifluoro-1-butene, 1,3,3-trifluoro-1-butene, 1,3,4-trifluoro-1-butene, 1,4,4-trifluoro-1-butene, 2,3,3-trifluoro-1-butene, 2,3,4-trifluoro-1-butene, 2,4,4-trifluoro-1-butene, 3,3,4-trifluoro-1-butene, 3,4,4-trifluoro-1-butene, 4,4,4-trifluoro-1-butene, 1,1,1-trifluoro-2-butene, 1,1,2-trifluoro-2-butene, 1,1,3-trifluoro-2-butene, 1,1,4-trifluoro-2-butene, 1,2,3-trifluoro-2-butene, 1,2,4-trifluoro-2-butene, 1,1,2,3-tetrafluoro-1-butene, 1,1,2,4-tetrafluoro-1-butene, 1,1,3,3-tetrafluoro-1-butene, 1,1,3,4-tetrafluoro-1-butene, 1,1,4,4-tetrafluoro-1-butene, 1,2,3,3-tetrafluoro-1-butene, 1,2,3,4-tetrafluoro-1-butene, 1,2,4,4-tetrafluoro-1-butene, 1,3,3,4-tetrafluoro-1-butene, 1,4,4,4-tetrafluoro-1-butene, 2,3,3,4-tetrafluoro-1-butene, 2,3,4,4-tetrafluoro-1-butene, 2,4,4,4-tetrafluoro-1-butene, 3,3,4,4-tetrafluoro-1-butene, 3,4,4,4-tetrafluoro-1-butene, 1,1,1,2-tetrafluoro-2-butene, 1,1,1,3-tetrafluoro-2-butene, 1,1,1,4-tetrafluoro-2-butene, 1,1,2,3-tetrafluoro-2-butene, 1,1,2,4-tetrafluoro-2-butene, 1,2,3,4-tetrafluoro-2-butene, 1,1,2,3,3-pentafluoro-1-butene, 1,1,2,3,4-pentafluoro-1-butene, 1,1,2,4,4-pentafluoro-1-butene, 1,1,3,3,4-pentafluoro-1-butene, 1,1,3,4,4-pentafluoro-1-butene, 1,1,4,4,4-pentafluoro-1-butene, 1,2,3,3,4-pentafluoro-1-butene, 1,2,3,4,4-pentafluoro-1-butene, 1,2,4,4,4-pentafluoro-1-butene, 2,3,3,4,4-pentafluoro-1-butene, 2,3,4,4,4-pentafluoro-1-butene, 3,3,4,4,4-pentafluoro-1-butene, 1,1,1,2,3-pentafluoro-2-butene, 1,1,1,2,4-pentafluoro-2-butene, 1,1,1,3,4-pentafluoro-2-butene, 1,1,1,4,4-pentafluoro-2-butene, 1,1,2,3,4-pentafluoro-2-butene or 1,1,2,4,4-pentafluoro-2-butene, and mixtures of one or more from among 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO1234ye) and 3,3,3-trifluoropropene (HFO-1243zf) are preferred. From the viewpoint of refrigerant properties, it is preferred to use one or more selected from among HFO-1225ye, HFO-1234ze and HFO-1234yf.

The refrigerant used for the embodiment may be a refrigerant mixture comprising an unsaturated fluorinated hydrocarbon refrigerant and another refrigerant. Other refrigerants include HFC refrigerants, fluorinated ether-based refrigerants such as perfluoroethers, and natural refrigerants including dimethyl ether, ammonia, hydrocarbons and the like.

HFC refrigerants include C1-3 and preferably C1-2 hydrofluorocarbons. Specific examples include difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365 mfc), as well as mixtures of two or more thereof. These refrigerants may be appropriately selected depending on the purpose of use and the required performance, but preferred examples include HFC-32 alone; HFC-23 alone; HFC-134a alone; HFC-125 alone; HFC-134a/HFC-32=60-80% by mass/40-20% by mass mixture; HFC-32/HFC-125=40-70% by mass/60-30% by mass mixture: HFC-125/HFC-143a=40-60% by mass/60-40% by mass mixture; HFC-134a/HFC-32/HFC-125=60% by mass/30% by mass/10% by mass mixture; HFC-134a/HFC-32/HFC-125=40-70% by mass/15-35% by mass/5-40% by mass mixture; and HFC-125/HFC-134a/HFC-143a=35-55% by mass/1-15% by mass/40-60% by mass mixture. More specifically, these include HFC-134a/HFC-32=70/30% by mass mixture; HFC-32/HFC-125=60/40% by mass mixture; HFC-32/HFC-125=50/50% by mass mixture (R410A); HFC-32/HFC-125=45/55% by mass mixture (R410B); HFC-125/HFC-143a=50/50% by mass mixture (R507C); HFC-32/HFC-125/HFC-134a=30/10/60% by mass mixture; HFC-32/HFC-125/HFC-134a=23/25/52% by mass mixture (R407C); HFC-32/HFC-125/HFC-134a=25/15/60% by mass mixture (R407E); and HFC-125/HFC-134a/HFC-143a=44/4/52% by mass mixture (R404A).

As saturated hydrofluorocarbons among HFC refrigerants, there are preferred one or mixtures of two or more selected from among difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365 mfc), and from the viewpoint of refrigerant properties there are especially preferred HFC-32, HFC-125, HFC-134a, HFC-152a and mixtures of HFC-32 and HFC-134a.

As hydrocarbon refrigerants there are preferred C3-5 hydrocarbons, and as specific examples there may be mentioned methane, ethylene, ethane, propylene, propane, cyclopropane, normal-butane, isobutane, cyclobutane, methylcyclopropane, 2-methylbutane, normal-pentane, and mixtures of two or more of the foregoing. Preferred among these are refrigerants that are gases at 25° C., 1 atmosphere, such as propane, normal-butane, isobutane, 2-methylbutane, and mixtures thereof.

Specific examples of fluorinated ether-based refrigerants include HFE-134p, HFE-245mc, HFE-236mf, HFE-236me, HFE-338mcf, HFE-365mcf, HFE-245mf, HFE-347 mmy, HFE-347mcc, HFE-125, HFE-143m, HFE-134m, HFE- 227me and the like, and these refrigerants may be appropriately selected depending on the purpose of use and the required performance.

When the refrigerant used for the embodiment is a refrigerant mixture, the refrigerant mixture preferably contains at least one component selected from among unsaturated fluorinated hydrocarbon refrigerants (hereinafter referred to as "refrigerant (A)") and at least one component selected from among saturated hydrofluorocarbon, C3-5 hydrocarbon, dimethyl ether, carbon dioxide, bis(trifluoromethyl)sulfide and trifluoroiodomethane refrigerants (hereinafter referred to as "refrigerant (B)").

When the refrigerant used for the embodiment is a refrigerant mixture comprising refrigerant (A) and refrigerant (B), the refrigerant mixture is preferably an azeotropic mixture, but it does not need to be an azeotropic mixture so long as it has the properties required as a refrigerant, and the mixing ratio of both components is preferably 1:99-99:1 and more preferably 5:95-95:5.

Also, when the refrigerant used for the embodiment is a refrigerant mixture comprising refrigerant (A) and refrigerant (B), the refrigerant mixture may further contain an HFC refrigerant other than the unsaturated fluorinated hydrocarbon refrigerant or saturated hydrofluorocarbon, a fluorinated ether-based refrigerant such as a perfluoroether, or a natural refrigerant such as a hydrocarbon other than a C3-5 hydrocarbon, or ammonia.

The refrigerating machine oil of the embodiment will usually be in the form of a refrigerator fluid composition, as a mixture of an unsaturated fluorinated hydrocarbon refrigerant or a refrigerant mixture as mentioned above, in a refrigerating air conditioner. There are no particular restrictions on the mixing proportion of the refrigerating machine oil and refrigerant in the composition, or on the mixing proportion of the refrigerating machine oil and refrigerant in the working fluid composition for a refrigerator machine according to the embodiment, but the refrigerating machine oil content is preferably 1-500 parts by weight and more preferably 2-400 parts by weight with respect to 100 parts by weight of the refrigerant.

The refrigerating machine oil and working fluid composition for a refrigerator machine of the embodiment is preferably used in an air conditioner or refrigerator with a reciprocating or rotating hermetic type compressor, or in an open or hermetic type automobile air conditioner. The refrigerating machine oil and working fluid composition for a refrigerator machine according to the embodiment may also be suitably used in cooling devices of dehumidifiers, water heaters, freezers, storage/refrigerated warehouses, automatic vending machines, showcases, chemical plants and the like. The refrigerating machine oil and working fluid composition for a refrigerator machine according to the embodiment may also be suitably used in devices with centrifugal compressors.

The working fluid composition for a refrigerator machine according to the embodiment may be suitably used in refrigerator machines for unsaturated fluorinated hydrocarbon refrigerants, as mentioned above, and a typical construction of a refrigerant circulation cycle comprising the refrigerator machine has a compressor, a condenser, an expansion mechanism and an evaporator, and if necessary a desiccator, a flexible hose and the like.

The compressor used may be either an open type compressor having a prime mover on the exterior, or a hermetic type compressor having a motor built into the interior.

Open type compressors include piston/crank and piston/swashplate reciprocating types, and rotating types such as rotating piston types, rotary vane types, scroll types and screw types. External prime movers include engines, motors and the like, and driving engines are commonly employed as external prime movers, especially in automobile air conditioners.

Examples of hermetic type compressors include high-pressure container-type compressors housing a motor comprising a rotor and a stator in a sealed container storing a refrigerating machine oil, a rotation axis fitted in the rotor, and a compressor that is linked to the motor via the rotation axis, wherein high-pressure refrigerant gas discharged by the compressor is retained in the sealed container, and low-pressure container-type compressors housing a motor comprising a rotor and a stator in a sealed container storing a refrigerating machine oil, a rotation axis fitted in the rotor, and a compressor linked to the motor via the rotation axis, wherein high-pressure refrigerant gas discharged by the compressor is directly ejected out of the sealed container.

As insulating films for use as electrical insulating system materials in motors, it is preferred to use crystalline plastic films with glass transition points of 50° C. or higher, and specifically one or more insulating films selected from the group consisting of polyethylene terephthalate, polybutylene terephthalate, polyphenylene sulfide, polyetheretherketone, polyethylene naphthalate, polyamideimide and polyimide films, or composite films comprising a resin layer with a high glass transition temperature covering a film with a low glass transition temperature, because they are resistant to degradation of tensile strength properties and electrical insulation properties. In addition, magnet wires used in motors are preferably ones having an enamel coating with a glass transition temperature of 120° C. or higher, such as a single polyester, polyesteramide, polyamide or polyamideimide layer, or an enamel coating that is a composite coating comprising a layer with a low glass transition temperature as the lower layer and a layer with a high glass transition temperature as the upper layer. Enamel wire with composite coatings include those comprising a polyesteramide as the lower layer and a polyamideimide coated as the upper layer (AI/EI), and those comprising a polyester as the lower layer and a polyamideimide coated as the upper layer (AI/PE).

As desiccants for packing into desecrators, there are preferably used synthetic zeolites comprising silicic acid and alkali aluminate metal complex salts, having a carbon dioxide gas absorption volume of no greater than 1.0%, with a pore size of no greater than 3.3 angstrom and a carbon dioxide gas partial pressure of 250 mmHg at 25° C. Specific examples include XH-9, XH-10, XH-11 and XH-600, trade names of Union Showa, KK.

Flexible hoses are commonly used in automobile air conditioners, and in most cases rubber hoses with excellent vibration absorption performance are used, having a structure in which, in order to prevent refrigerant leakage, a polyamide resin layer having an excellent gas barrier property and excellent impulse resistance and vibration endurance is situated as the innermost layer, a rubber inner tube layer is formed over this layer, a reinforcing yarn layer made of organic fibers such as PET fibers is additionally formed thereover, and a weather-resistant jacket layer is further provided as a covering.

Refrigerant permeation resistance and flexibility are sometimes provided by forming the innermost gas barrier layer using a polyamide resin composition comprising a polyolefin-based elastomer added to the polyamide resin as a flexibilizer.

Polyamide resins have amino acids, lactams or diamines and dicarboxylic acids as their main constituent components, specific examples of which include lactams such as s-caprolactam, enatholactam and ω-laurolactam, amino acids such as s-aminocaproic acid, 11-aminoundecanoic acid and 12-aminododecanoic acid, diamines such as tetramethylenediamine, hexamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bisaminomethylcyclohexane, 1,4-bisaminomethylcyclohexane, bis-p-aminocyclohexylmethane, bis-p-aminocyclohexylpropane and isophorone diamine, and dicarboxylic acids such as adipic acid, suberic acid, azelaic acid, sebacic acid, dodecanedioic acid, 1,4-cyclohexanedicarboxylic acid, 1,3-cyclohexanedicarboxylic acid, terephthalic acid, isophthalic acid, naphthalenedicarboxylic acid and dimer acid.

These constituent components are supplied for polymerization either alone or as mixtures of two or more types, and the obtained polyamide resins may be either homopolymers or copolymers.

Specific examples of polyamide resins include polycapramide (nylon 6), polyhexamethylene adipamide (nylon 66), polytetramethylene adipamide (nylon 46), polyhexamethylene sebacamide (nylon 610), polyundecaneamide (nylon 11), polydodecaneamide (nylon 12), polyhexamethylene adipamide/hexamethylene terephthalamide copolymer (nylon 66/6T) and polycapramide/polyhexamethylene adipamide copolymer (nylon 6/66), and these may be used alone or in combinations of two or more.

There are no particular restrictions on the polymerization degree of the polyamide resin, and it may be any one whose relative viscosity in a 1% by mass sulfuric acid solution at 25° C. (hereunder also referred to simply as "relative viscosity") is in the range of 1.5-5.0. In addition, the end group concentration of the polyamide resin can be adjusted by adding one or more monocarboxylic acid compounds and/or dicarboxylic acid compounds, or monoamine compounds and/or diamine compounds as end groups to the polyamide, at any desired stage.

Examples of olefin-based elastomers include ethylene-butene copolymers, EPR (ethylene-propylene copolymers), modified ethylene-butene copolymers, EEA (ethylene-ethyl acrylate copolymers), modified EEA, modified EPR, modified EPDM (ethylene-propylene-diene terpolymers), ionomers, α-olefin copolymers, modified IR (isoprene rubbers), modified SEBS (styrene-ethylene-butylene-styrene copolymers), isobutylene-paramethylstyrene halide copolymers, ethylene-acrylic acid-modified compounds, ethylene-vinyl acetate copolymers, and acid-modified forms of the foregoing, as well as mixtures comprising these as main components. Any of these compounds may be used alone, or two or more thereof may be used in combination.

Particularly preferred as polyolefin-based elastomers are those modified with acid anhydrides such as maleic anhydride, alkyl acrylate esters such as glycidyl methacrylate, or epoxy compounds and their modified forms, which can yield a fine alloy structure with the polyamide resin as the base polymer.

If the polyolefin-based elastomer content of the polyamide resin composition is too low, it will not be possible to adequately obtain improving effects on the flexibility and durability by addition of the polyolefin-based elastomer, and if it is too high the gas barrier property will be reduced, and therefore the content is preferably 10-45% by mass and especially 20-40% by mass in the polyamide resin composition. If the polyolefin-based elastomer content in the polyamide resin composition is too high, the sea phase and island phase in the sea-island structure described hereunder will become reversed, notably lowering the gas barrier property.

If a modified elastomer, such as an acid-modified elastomer, is used as the polyolefin-based elastomer it will be possible to obtain effects of lowering the specific energy during kneading (dispersion) and eliminating the need for higher kneading techniques, but an excessively high content can cause gelling of the resin, as well as outer appearance defects such as surface roughening (fisheyes) during extrusion, and therefore when a modified elastomer is used as the polyolefin-based elastomer, the modified elastomer content is preferably no greater than 20% by mass, such as 5-20% by mass, in the polyamide resin composition. Most preferably, 40-100% by mass of the polyolefin-based elastomer in the polyamide resin composition consists of an acid-modified elastomer.

In order to obtain a satisfactory compatibilized, or dispersed, state between the polyamide resin and polyolefin-based elastomer in the polyamide resin composition, preferably at least a portion of the elastomer is modified with maleic anhydride or the like, and for a more satisfactory dispersed state, the average acid value (acid modification rate) in the entire elastomer that is used is preferably 0.8 mg —$CH_3ONa$/g or greater.

A higher acid value of the elastomer will result in a more satisfactory dispersed state, but a higher acid value will also result in a higher viscosity of the obtained polyamide resin composition, which can impair the molding workability. In order to minimize the increase in viscosity that occurs with higher acid values, therefore, the acid value of the elastomer is preferably lower within the range in which a satisfactory dispersed state can be obtained, and preferably the average acid value in the entire elastomer is no greater than 7.5 mg —$CH_3ONa$/g.

When the acid value of the modified elastomer in the elastomer is high, even with the same average acid value, mixture of the modified elastomer with the unmodified elastomer causes production of gelled matter thought to be due to local over reaction during extrusion, even when the average acid value is reduced. The acid value of the modified elastomer used is therefore preferred to be no greater than 15.0 mg —$CH_3ONa$/g.

Thus, when a polyamide resin composition comprising a polyolefin-based elastomer combined with a polyamide resin is used, reduction in the gas barrier property cannot be avoided even though the flexibility and durability are improved. However, if a fine alloy structure of a polyamide resin and elastomer is formed, in which the structure has the island phase of the elastomer dispersed in the sea phase of the polyamide resin and the polyamide resin dispersed as points in the island phase of the elastomer, it will be possible to avoid reduction in the gas barrier property caused by the elastomer addition, and this is therefore preferred.

Most preferably, the proportion of the polyamide resin phase that is dispersed as points in the island phase of the elastomer with respect to the polyamide resin (the total of the polyamide resin composing the sea phase and the polyamide resin phase dispersed as points in the island phase of the elastomer) (this proportion will hereunder be referred to as "point-dispersed dispersion rate") is about 5-40% by mass. If this proportion is less than 5% by mass, it will not be possible to obtain an adequate effect by point dispersion of the polyamide resin phase in the island phase of the elastomer, while if it is greater than 40% by mass, on the other hand, the polyamide resin phase present as the sea phase will be insufficient and the gas barrier property may be reduced.

The size of the island phase of the elastomer and the size of the polyamide resin phase in the island phase of the elastomer are preferably approximately 0.1-3.0 μm for the island phase of the elastomer and approximately 0.5-2.0 μm for the polyamide resin phase.

The polyamide resin composition may contain a resin component other than the polyamide resin, in which case at least 70% by mass of the total polymer component in the refrigerant transport hose preferably consists of the polyamide resin, in order to ensure a satisfactory gas barrier property. Other resin components to be used in this case include ethylene-vinyl alcohol resins.

The polyamide resin composition may also contain other additives, such as lubricants, antistatic agents, age inhibitors, antioxidants, coloring agents, crystal nucleating agents, fillers, reinforcing materials, heat-proofing agents and light fastness agents.

The rubber composing the inner rubber layer and the rubber jacket layer may be, for most purposes, butyl rubber (IIR), chlorinated butyl rubber (Cl-IIR), chlorinated polyethylene, chlorosulfonated polyethylene, brominated butyl rubber (Br-IIR), isobutylene-bromoparamethylstyrene copolymer, EPR (ethylene-propylene copolymer), EPDM (ethylene-propylene-diene terpolymer), NBR (acrylonitrile-butadiene rubber), CR (chloroprene rubber), hydrogenated NBR, acrylic rubber, ethylene-acrylic rubber (AEM), blends of 2 or more of these rubbers, or blends of polymers composed mainly of these rubbers, among which butyl-based rubber and EPDM-based rubber are preferred. Such rubbers may be used as formulations in combination with commonly employed fillers, processing aids, age inhibitors, vulcanizing agents, vulcanization accelerators and the like.

The type of rubber in the inner rubber layer and the type of rubber in the rubber jacket layer may be the same or different types.

The reinforcing yarn layer comprises reinforcing yarn wrapped into a spiral form, and the material of the reinforcing yarn is not particularly restricted so long as it is one that is commonly used. Commonly used materials include polyesters, total aromatic polyesters, nylon, vinylon, rayon, aramids, polyallylates, polyethylene naphthalate, and their mixed twisted yarns.

EXAMPLES

The present invention will now be explained in greater detail based on examples and comparative examples, with the understanding that the present invention is in no way limited to the examples.

Examples 1-32 and Comparative Examples 1-6

Sample oils were prepared for Examples 1-32 and Comparative Examples 1-6, by combining base oils 1-3 and additives A1-D3, indicated below, in the compositional ratios listed in Tables 1-10. The properties of the obtained sample oils are shown in Tables 1-10.

(Base Oils)
Base oil 1: Polypropyleneglycol dimethyl ether (kinematic viscosity at 40° C.: 45 mm$^2$/s, kinematic viscosity at 100° C.: 10 mm$^2$/s, number-average molecular weight: 1200)
Base oil 2: Polyethylenepropyleneglycol monomethyl ether (kinematic viscosity at 40° C.: 104 mm$^2$/s, kinematic viscosity at 100° C.: 20 mm$^2$/s, number-average molecular weight: 1800, proportion of oxyethylene groups among total oxyalkylene groups: 40 mol %)
Base oil 3: Copolymer of ethylvinyl ether and isobutylvinyl ether (ethylvinyl ether/isobutylvinyl ether=7/1 (molar ratio), number-average molecular weight: 860, carbon/oxygen molar ratio: 4.25)

(Additives)
Additive A1: bis(Dipropylphenyl)carbodiimide
Additive A2: bis(Dibutylphenyl)carbodiimide
Additive A3: Diisopropylcarbodiimide
Additive B1: Tricresyl phosphate
Additive B2: Triphenyl phosphorothionate
Additive B3: Monododecylamine salt of dihexyl acid phosphate
Additive C1: 2,6-Di-tert-butyl-p-cresol
Additive C2: Dioctyldiphenylamine
Additive C3: Dinonyldiphenylamine
Additive C4: Octylphenyl-α-naphthylamine
Additive D1: p-tert-Butylphenyl glycidyl ether
Additive D2: Glycidyl-2,2'-dimethyl octanoate
Additive D3: 1,2-Epoxyoctadecane Each of the refrigerating machine oils obtained in Examples 1-32 and Comparative Examples 1-6 was subjected to the following test.

(Nylon Compatibility Test)
In a 200 ml autoclave there were placed 70 g of sample oil prepared with a moisture content of 2000 ppm, 30 g of HFO-1234yf refrigerant, Al, Cu and Fe catalysts, and 5 commercially available nylon 6 films (MS K6251 #3 dumbbell), and after heating at 150° C. for 168 hours, the acid value of each tested sample oil was measured. All of the 5 nylon 6 films were measured for tensile strength and elongation, and the elongation change (%) was calculated according to the following formula. The results are shown in Tables 1 to 10.

Elongation change[%]=[(elongation of nylon film after test)/(elongation of nylon film before test)−1]×100

TABLE 1

| | | Example 1 | Example 2 | Example 3 | Example 4 |
|---|---|---|---|---|---|
| Composition (% by mass) | Base oil 1 | 99.95 | 99.9 | 99.99 | 99.95 |
| | Base oil 2 | — | — | — | — |
| | Base oil 3 | — | — | — | — |
| | Additive A1 | 0.05 | 0.1 | 0.01 | — |
| | Additive A2 | — | — | — | 0.05 |
| | Additive A3 | — | — | — | — |
| | Additive B1 | — | — | — | — |
| | Additive B2 | — | — | — | — |
| | Additive B3 | — | — | — | — |
| | Additive C1 | — | — | — | — |
| | Additive C2 | — | — | — | — |
| | Additive C3 | — | — | — | — |
| | Additive C4 | — | — | — | — |
| | Additive D1 | — | — | — | — |
| | Additive D2 | — | — | — | — |
| | Additive D3 | — | — | — | — |
| Nylon compatibility test | Acid value (mgKOH/g) | 0.03 | 0.02 | 0.05 | 0.02 |
| | Elongation change (%) | −15 | −18 | −14 | −15 |

TABLE 2

| | | Example 5 | Example 6 | Example 7 | Example 8 |
|---|---|---|---|---|---|
| Composition (% by mass) | Base oil 1 | 99.95 | 99.75 | 99.75 | 99.82 |
| | Base oil 2 | — | — | — | — |
| | Base oil 3 | — | — | — | — |
| | Additive A1 | — | 0.05 | 0.05 | 0.05 |
| | Additive A2 | — | — | — | — |
| | Additive A3 | 0.05 | — | — | — |
| | Additive B1 | — | 0.1 | — | — |
| | Additive B2 | — | — | 0.1 | — |

TABLE 2-continued

|  |  | Example 5 | Example 6 | Example 7 | Example 8 |
|---|---|---|---|---|---|
|  | Additive B3 | — | — | — | 0.03 |
|  | Additive C1 | — | 0.1 | 0.1 | 0.1 |
|  | Additive C2 | — | — | — | — |
|  | Additive C3 | — | — | — | — |
|  | Additive C4 | — | — | — | — |
|  | Additive D1 | — | — | — | — |
|  | Additive D2 | — | — | — | — |
|  | Additive D3 | — | — | — | — |
| Nylon compatibility test | Acid value (mgKOH/g) | 0.03 | 0.02 | 0.03 | 0.02 |
|  | Elongation change (%) | −16 | −23 | −22 | −24 |

TABLE 3

|  |  | Example 9 | Example 10 | Example 11 | Example 12 |
|---|---|---|---|---|---|
| Composition (% by mass) | Base oil 1 | 99.35 | 99.35 | 99.42 | 99.42 |
|  | Base oil 2 | — | — | — | — |
|  | Base oil 3 | — | — | — | — |
|  | Additive A1 | 0.05 | 0.05 | 0.05 | 0.05 |
|  | Additive A2 | — | — | — | — |
|  | Additive A3 | — | — | — | — |
|  | Additive B1 | 0.1 | — | — | — |
|  | Additive B2 | — | 0.1 | — | — |
|  | Additive B3 | — | — | 0.03 | 0.03 |
|  | Additive C1 | — | — | — | — |
|  | Additive C2 | 0.5 | 0.5 | 0.5 | — |
|  | Additive C3 | — | — | — | 0.5 |
|  | Additive C4 | — | — | — | — |
|  | Additive D1 | — | — | — | — |
|  | Additive D2 | — | — | — | — |
|  | Additive D3 | — | — | — | — |
| Nylon compatibility test | Acid value (mgKOH/g) | 0.01 | 0.01 | 0.02 | 0.01 |
|  | Elongation change (%) | −18 | −20 | −19 | −21 |

TABLE 4

|  |  | Example 13 | Example 14 | Example 15 | Example 16 |
|---|---|---|---|---|---|
| Composition (% by mass) | Base oil 1 | 99.42 | 98.75 | 98.75 | 98.82 |
|  | Base oil 2 | — | — | — | — |
|  | Base oil 3 | — | — | — | — |
|  | Additive A1 | 0.05 | 0.05 | 0.05 | 0.05 |
|  | Additive A2 | — | — | — | — |
|  | Additive A3 | — | — | — | — |
|  | Additive B1 | — | 0.1 | — | — |
|  | Additive B2 | — | — | 0.1 | — |
|  | Additive B3 | 0.03 | — | — | 0.03 |
|  | Additive C1 | — | 0.1 | 0.1 | 0.1 |
|  | Additive C2 | — | — | — | — |
|  | Additive C3 | — | — | — | — |
|  | Additive C4 | 0.5 | — | — | — |
|  | Additive D1 | — | 1 | 1 | 1 |
|  | Additive D2 | — | — | — | — |
|  | Additive D3 | — | — | — | — |
| Nylon compatibility test | Acid value (mgKOH/g) | 0.02 | 0.01 | 0.02 | 0.01 |
|  | Elongation change (%) | −20 | −30 | −29 | −33 |

TABLE 5

|  |  | Example 17 | Example 18 | Example 19 | Example 20 |
|---|---|---|---|---|---|
| Composition (% by mass) | Base oil 1 | 98.35 | 98.35 | 98.42 | 98.75 |
|  | Base oil 2 | — | — | — | — |
|  | Base oil 3 | — | — | — | — |
|  | Additive A1 | 0.05 | 0.05 | 0.05 | 0.05 |
|  | Additive A2 | — | — | — | — |
|  | Additive A3 | — | — | — | — |
|  | Additive B1 | 0.1 | — | — | 0.1 |
|  | Additive B2 | — | 0.1 | — | — |
|  | Additive B3 | — | — | 0.03 | — |
|  | Additive C1 | — | — | — | 0.1 |
|  | Additive C2 | 0.5 | 0.5 | 0.5 | — |
|  | Additive C3 | — | — | — | — |
|  | Additive C4 | — | — | — | — |
|  | Additive D1 | 1 | 1 | 1 | — |
|  | Additive D2 | — | — | — | 1 |
|  | Additive D3 | — | — | — | — |
| Nylon compatibility test | Acid value (mgKOH/g) | 0.01 | 0.01 | 0.02 | 0.01 |
|  | Elongation change (%) | −32 | −29 | −30 | −28 |

TABLE 6

|  |  | Example 21 | Example 22 | Example 23 |
|---|---|---|---|---|
| Composition (% by mass) | Base oil 1 | 98.82 | 98.35 | 98.42 |
|  | Base oil 2 | — | — | — |
|  | Base oil 3 | — | — | — |
|  | Additive A1 | 0.05 | 0.05 | 0.05 |
|  | Additive A2 | — | — | — |
|  | Additive A3 | — | — | — |
|  | Additive B1 | — | 0.1 | — |
|  | Additive B2 | — | — | — |
|  | Additive B3 | 0.03 | — | 0.03 |
|  | Additive C1 | 0.1 | — | — |
|  | Additive C2 | — | 0.5 | 0.5 |
|  | Additive C3 | — | — | — |
|  | Additive C4 | — | — | — |
|  | Additive D1 | — | — | — |
|  | Additive D2 | 1 | 1 | 1 |
|  | Additive D3 | — | — | — |
| Nylon compatibility test | Acid value (mgKOH/g) | 0.01 | 0.02 | 0.01 |
|  | Elongation change (%) | −29 | −31 | −31 |

TABLE 7

|  |  | Example 24 | Example 25 | Example 26 | Example 27 |
|---|---|---|---|---|---|
| Composition (% by mass) | Base oil 1 | 98.75 | 98.82 | 98.35 | 98.42 |
|  | Base oil 2 | — | — | — | — |
|  | Base oil 3 | — | — | — | — |
|  | Additive A1 | 0.05 | 0.05 | 0.05 | 0.05 |
|  | Additive A2 | — | — | — | — |
|  | Additive A3 | — | — | — | — |
|  | Additive B1 | 0.1 | — | 0.1 | — |
|  | Additive B2 | — | — | — | — |
|  | Additive B3 | — | 0.03 | — | 0.03 |
|  | Additive C1 | 0.1 | 0.1 | — | — |
|  | Additive C2 | — | — | 0.5 | 0.5 |
|  | Additive C3 | — | — | — | — |
|  | Additive C4 | — | — | — | — |
|  | Additive D1 | — | — | — | — |
|  | Additive D2 | — | — | — | — |
|  | Additive D3 | 1 | 1 | 1 | 1 |
| Nylon compatibility test | Acid value (mgKOH/g) | 0.01 | 0.01 | 0.02 | 0.01 |
|  | Elongation change (%) | −27 | −28 | −30 | −31 |

TABLE 8

|  |  | Example 28 | Example 29 | Example 30 |
|---|---|---|---|---|
| Composition (% by mass) | Base oil 1 | — | — | — |
|  | Base oil 2 | — | 99.7 | — |
|  | Base oil 3 | 98.7 | — | 99.7 |
|  | Additive A1 | 0.1 | 0.1 | 0.1 |
|  | Additive A2 | — | — | — |
|  | Additive A3 | — | — | — |
|  | Additive B1 | 0.1 | 0.1 | 0.1 |
|  | Additive B2 | — | — | — |
|  | Additive B3 | — | — | — |
|  | Additive C1 | 0.1 | 0.1 | 0.1 |
|  | Additive C2 | — | — | — |
|  | Additive C3 | — | — | — |
|  | Additive C4 | — | — | — |
|  | Additive D1 | — | — | — |
|  | Additive D2 | — | — | — |
|  | Additive D3 | 1 | — | — |
| Nylon compatibility test | Acid value (mgKOH/g) | 0.00 | 0.03 | 0.02 |
|  | Elongation change (%) | −30 | −21 | −18 |

TABLE 9

|  |  | Example 31 | Example 32 | Comp. Example 1 | Comp. Example 2 |
|---|---|---|---|---|---|
| Composition (% by mass) | Base oil 1 | 99.7 | 99.7 | 100 | 99.8 |
|  | Base oil 2 | — | — | — | — |
|  | Base oil 3 | — | — | — | — |
|  | Additive A1 | — | — | — | — |
|  | Additive A2 | 0.1 | — | — | — |
|  | Additive A3 | — | 0.1 | — | — |
|  | Additive B1 | 0.1 | 0.1 | — | 0.1 |
|  | Additive B2 | — | — | — | — |
|  | Additive B3 | — | — | — | — |
|  | Additive C1 | 0.1 | 0.1 | — | 0.1 |
|  | Additive C2 | — | — | — | — |
|  | Additive C3 | — | — | — | — |
|  | Additive C4 | — | — | — | — |
|  | Additive D1 | — | — | — | — |
|  | Additive D2 | — | — | — | — |
|  | Additive D3 | — | — | — | — |
| Nylon compatibility test | Acid value (mgKOH/g) | 0.02 | 0.02 | 1.02 | 0.15 |
|  | Elongation change (%) | −17 | −20 | −11 | −34 |

TABLE 10

|  |  | Comp. Example 3 | Comp. Example 4 | Comp. Example 5 | Comp. Example 6 |
|---|---|---|---|---|---|
| Composition (% by mass) | Base oil 1 | 99 | 99 | 99 | 98.8 |
|  | Base oil 2 | — | — | — | — |
|  | Base oil 3 | — | — | — | — |
|  | Additive A1 | — | — | — | — |
|  | Additive A2 | — | — | — | — |
|  | Additive A3 | — | — | — | — |
|  | Additive B1 | — | — | — | 0.1 |
|  | Additive B2 | — | — | — | — |
|  | Additive B3 | — | — | — | — |
|  | Additive C1 | — | — | — | 0.1 |
|  | Additive C2 | — | — | — | — |
|  | Additive C3 | — | — | — | — |
|  | Additive C4 | — | — | — | — |
|  | Additive D1 | 1 | — | — | 1 |
|  | Additive D2 | — | 1 | — | — |
|  | Additive D3 | — | — | 1 | — |
| Nylon compatibility test | Acid value (mgKOH/g) | 0.05 | 0.07 | 0.06 | 0.03 |
|  | Elongation change (%) | −55 | −58 | −56 | −76 |

What is claimed is:

1. A working fluid composition for a refrigerator machine, comprising:
a refrigerating machine oil comprising a base oil containing an ether-based compound selected from the group consisting of a polyalkylene glycol represented by the following formula (2), (3), (5), (6), (7) or (8), a polyvinyl ether, a polyphenyl ether and a perfluoroether, $$CH_3O-(C_3H_6O)_h-CH_3 \quad (2)$$

wherein h represents an integer of 6-80, $$CH_3O-(C_2H_4O)_i-(C_3H_6O)_j-CH_3 \quad (3)$$

wherein i and j are each 1 or greater, and are numbers such that the total of i and j is 6-80, $$CH_3O-(C_3H_6O)_l-H \quad (5)$$

wherein l represents an integer of 6-80, $$CH_3O-(C_2H_4O)_m-(C_3H_6O)_n-H \quad (6)$$

wherein m and n are each 1 or greater, and are numbers such that the total of m and n is 6-80, $$C_4H_9O-(C_2H_4O)_m-(C_3H_6O)_n-H \quad (7)$$

wherein m and n are each 1 or greater, and are numbers such that the total of m and n is 6-80, $$CH_3COO-(C_3H_6O)_l-COCH_3 \quad (8)$$

wherein, l represents an integer of 6-80,
wherein the content of the ether-based compound is at least 70% by mass based on the total amount of the refrigerating machine oil,
a carbodiimide compound, and
an unsaturated fluorinated hydrocarbon refrigerant.

2. A working fluid composition for a refrigerator machine according to claim 1, comprising at least one selected from among 1,2,3,3,3-pentafluoropropene, 1,3,3,3-tetrafluoropropene, 2,3,3,3-tetrafluoropropene, 1,2,3,3-tetrafluoropropene and 3,3,3-trifluoropropene, as the unsaturated fluorinated hydrocarbon refrigerant.

3. A working fluid composition for a refrigerator machine according to claim 1, further comprising at least one refrigerant selected from among saturated hydrofluorocarbons, C3-5 hydrocarbons, dimethyl ether, carbon dioxide, bis(trifluoromethyl)sulfide and trifluoroiodomethane.

4. A working fluid composition for a refrigerator machine according to claim 3,
wherein the unsaturated fluorinated hydrocarbon refrigerant is at least one selected from among 1,2,3,3,3-pentafluoropropene, 1,3,3,3-tetrafluoropropene, 2,3,3,3-tetrafluoropropene, 1,2,3,3-tetrafluoropropene and 3,3,3-trifluoropropene,
wherein the saturated hydrofluorocarbon is at least one selected from among difluoromethane, pentafluoroethane, 1,1,2,2-tetrafluoroethane, 1,1,1,2-tetrafluoroethane, 1,1-difluoroethane, fluoroethane, 1,1,1,2,3,3,3heptafluoropropane, 1,1,1,2,3,3-hexafluoropropane, 1,1,1,3,3,3-hexafluoropropane, 1,1,1,3,3-pentafluoropropane and 1,1,1,3,3-pentafluorobutane, and
wherein the C3-5 hydrocarbon is at least one selected from among propane, normal-butane, isobutane, 2-methylbutane and normal-pentane.

5. A refrigerating machine oil comprising:
a base oil containing an ether-based compound selected from the group consisting of a polyalkylene glycol represented by the following formula (2), (3), (5), (6), (7) or (8), a polyvinyl ether, a polyphenyl ether and a perfluoroether, $$CH_3O-(C_3H_6O)_h-CH_3 \quad (2)$$

wherein h represents an integer of 6-80, $$CH_3O-(C_2H_4O)_i-(C_3H_6O)_j-CH_3 \quad (3)$$

wherein i and j are each 1 or greater, and are numbers such that the total of i and j is 6-80, $$CH_3O-(C_3H_6O)_l-H \quad (5)$$

wherein l represents an integer of 6-80, $$CH_3O-(C_2H_4O)_m-(C_3H_6O)_n-H \quad (6)$$

wherein m and n are each 1 or greater, and are numbers such that the total of m and n is 6-80, $$C_4H_9O-(C_2H_4O)_m-(C_3H_6O)_n-H \quad (7)$$

wherein m and n are each 1 or greater, and are numbers such that the total of m and n is 6-80, $$CH_3COO-(C_3H_6O)_l-COCH_3 \quad (8)$$

wherein, l represents an integer of 6-80,
wherein the content of the ether-based compound is at least 70% by mass based on the total amount of the refrigerating machine oil, and
a carbodiimide compound,
the refrigerating machine oil capable of being used together with an unsaturated fluorinated hydrocarbon refrigerant.

* * * * *

UNITED STATES PATENT AND TRADEMARK OFFICE
CERTIFICATE OF CORRECTION

PATENT NO.        : 8,889,031 B2
APPLICATION NO.   : 13/299652
DATED             : November 18, 2014
INVENTOR(S)       : K. Sawada et al.

It is certified that error appears in the above-identified patent and that said Letters Patent is hereby corrected as shown below:

In the Claims

Column 32, line 55 (claim 4, line 12) "1,1,1,2,3,3,3heptafluoropropane" should be
-- 1,1,1,2,3,3,3-heptafluoropropane --.

Signed and Sealed this
Thirty-first Day of March, 2015

Michelle K. Lee
*Director of the United States Patent and Trademark Office*